United States Patent
Kim

(10) Patent No.: US 9,629,499 B2
(45) Date of Patent: *Apr. 25, 2017

(54) CONVECTION COOKING APPARATUS

(71) Applicant: Dongbu Daewoo Electronics Corporation, Seoul (KR)

(72) Inventor: Han Ju Kim, Bucheon-si (KR)

(73) Assignee: Dongbu Daewoo Electronics Corporation, Seoul (KR)

( * ) Notice: Subject to any disclaimer, the term of this patent is extended or adjusted under 35 U.S.C. 154(b) by 668 days.

This patent is subject to a terminal disclaimer.

(21) Appl. No.: 14/085,077

(22) Filed: Nov. 20, 2013

(65) Prior Publication Data

US 2014/0318385 A1    Oct. 30, 2014

(30) Foreign Application Priority Data

Apr. 30, 2013   (KR) .................. 10-2013-0047945

(51) Int. Cl.
*F24C 15/32*   (2006.01)
*A47J 37/00*   (2006.01)

(52) U.S. Cl.
CPC .............. *A47J 37/00* (2013.01); *F24C 15/322* (2013.01)

(58) Field of Classification Search
CPC ........................... F24C 15/322; F24C 15/325
USPC ........... 99/447; 219/725–735, 400; 126/21 A
See application file for complete search history.

(56) References Cited

U.S. PATENT DOCUMENTS

| 2,862,095 | A | * | 11/1958 | Scofield | F24C 15/2014 126/21 A |
| 3,063,441 | A | * | 11/1962 | Stoligrosz | F24C 3/047 126/21 A |
| 4,395,233 | A | * | 7/1983 | Smith | F26B 21/02 126/21 A |
| 4,516,012 | A | * | 5/1985 | Smith | F26B 21/02 126/21 A |
| 4,892,030 | A | * | 1/1990 | Grieve | F27D 7/04 126/21 A |
| 5,365,833 | A | * | 11/1994 | Chen | F24B 1/003 126/273 R |
| 5,674,425 | A | * | 10/1997 | Hong | H05B 6/6476 126/21 A |
| 5,756,974 | A | * | 5/1998 | Hong | F24C 15/325 126/21 A |
| 6,100,503 | A | * | 8/2000 | Sasaki | H05B 3/74 219/400 |
| 6,831,255 | B1 | * | 12/2004 | Levi | F24C 7/06 126/21 A |

(Continued)

FOREIGN PATENT DOCUMENTS

KR   20110058135 A  *  6/2011

*Primary Examiner* — David Angwin
*Assistant Examiner* — John J Norton

(57) ABSTRACT

A cooking apparatus includes a cavity unit having therein a cooking chamber and a rear wall plate with an introduction hole section and a discharge hole section; a door on or over the cavity unit, configured to open and close an opening of the cavity unit; and a convection heater unit on or behind the rear wall plate, heating air from the cavity unit through the discharge hole section, and supplying hot air to the cooking chamber through the introduction hole section, wherein the introduction hole section is in a lower part of the rear wall plate, and the discharge hole section is in an upper part of the rear wall plate, separate from the introduction hole section.

10 Claims, 38 Drawing Sheets

(56) References Cited

U.S. PATENT DOCUMENTS

| | | | | |
|---|---|---|---|---|
| 8,212,188 B2* | 7/2012 | Kim | ............................ | F24C 15/18 |
| | | | | 126/21 A |
| 2004/0222208 A1* | 11/2004 | Ko | ............................ | F24C 15/327 |
| | | | | 219/401 |
| 2006/0131298 A1* | 6/2006 | Seuk Oh | ..................... | F24C 15/325 |
| | | | | 219/400 |
| 2009/0013988 A1* | 1/2009 | Kim | ........................ | A47J 37/0623 |
| | | | | 126/21 A |
| 2009/0090347 A1* | 4/2009 | Kim | ......................... | F24C 15/325 |
| | | | | 126/21 A |
| 2010/0229847 A1* | 9/2010 | Rogers | ....................... | F24C 15/322 |
| | | | | 126/21 A |
| 2010/0282731 A1* | 11/2010 | Jeong | ........................ | F24C 15/325 |
| | | | | 219/400 |

* cited by examiner

CONVECTION COOKING APPARATUS

CROSS-REFERENCES TO RELATED APPLICATIONS

The present application claims priority under 35 U.S.C 119(a) to Korean Patent Application No. 10-2013-0047945 filed on Apr. 30, 2013 in the Korean Intellectual Property Office, which is incorporated herein by reference in its entirety.

BACKGROUND

Exemplary embodiments of the present disclosure relate to a cooking apparatus, and more particularly, to a cooking apparatus which can carry out not only general cooking but also frying using hot air.

In general, fried food is prepared by coating various foods such as fish, meat and vegetables with flour or frying powder and then frying the coated materials in oil.

Since oil used in frying may easily oxidize, it should be frequently exchanged with new oil. In this regard, since difficulties exist in keeping and reusing the oil once used in frying, the cooking cost may be likely to increase.

The background art of the present disclosure is disclosed in Korean Unexamined Utility Model Publication No. 1998-0044155 (published on Sep. 25, 1998 and entitled "Continuous Automatic Food Fryer").

In the case of frying a cooking object using oil, since the oil is heated to a high temperature, the probability of a safety-related accident such as a burn increases. Also, in the case where it is necessary to defrost and fry a cooking object, defrosting and frying should be carried out in separate cooking containers, which may be cumbersome or inconvenient. Further, in frying, because heat is applied more to the outside than to the inside of the cooking object, the inside and the outside of the cooking object may not be evenly cooked. Therefore, a solution to these problems is desired.

SUMMARY

One or more embodiments of the present invention relate to a cooking apparatus that can fry foods using the fat in the food (e.g., the cooking object), thereby preventing the occurrence of a safety-related accident due to oil having a high temperature.

One or more other embodiments of the present invention relate to a cooking apparatus which can simultaneously carry out defrosting and frying of a cooking object.

One or more further embodiments of the present invention relate to a cooking apparatus which can evenly cook the inside and the outside of a cooking object when frying.

In one aspect, the cooking apparatus includes a cavity unit having a cooking chamber and a rear wall plate with an introduction hole section and a discharge hole section; a door on or over the cavity unit, configured to open and close an opening of the cavity unit; and a convection heater unit on or behind the rear wall plate, heating air from the cavity unit through the discharge hole section (e.g., entering the convection heater unit from the cooking chamber), and supplying hot air to the cooking chamber through the introduction hole section, wherein the introduction hole section is in a lower part of the rear wall plate, and the discharge hole section is in an upper part of the rear wall plate separate from the introduction hole section.

The convection heater unit may include a convection heater behind the rear wall plate, configured to generate heat; a convection fan behind the rear wall plate; a convection motor configured to rotate the convection fan; and a convection heater cover on the rear wall plate, covering the convection heater and the convection fan, where the introduction hole section may be below a rotation shaft of the convection fan, and the discharge hole section may be above the rotation shaft of the convection fan.

The convection heater unit may further include a convection insulating cover covering the convection heater cover, in front of the convection motor; and a convection cooling fan coupled to the convection motor, which may be configured to rotate when the convection motor operates.

The cooking apparatus may further include a circulation duct unit connected to a discharge hole section in a side wall plate of the cavity unit, guiding air discharged from the cooking chamber through the discharge hole section back to the cooking chamber.

The circulation duct unit may include a circulation duct having one end connected to the discharge hole section and another end connected to a suction hole section in the side wall plate, configured to guide air discharged through the discharge hole section to the suction hole section; and a duct opening and closing section in the circulation duct, configured to open and close an internal flow path of the circulation duct.

The circulation duct may have a discharge opening for discharging air entering through the discharge hole section out of the circulation duct, and the duct opening and closing section may close the discharge opening when opening the internal flow path of the circulation duct, and may open the discharge opening when closing the internal flow path of the circulation duct.

One of the discharge hole section and the suction hole section may be in an upper part of the side wall plate, and the other may be in a lower part of the side wall plate.

One of the discharge hole section and the suction hole section may be in a front part of the side wall plate, and the other may be in a rear part of the side wall plate.

The cooking apparatus may further include a discharge opening and closing unit on the side wall plate configured to open and close the discharge hole section in the side wall plate of the cavity unit.

The discharge opening and closing unit may include discharge rails on the side wall plate; and a discharge door that moves or slides along the discharge rails to open and close the discharge hole section.

In another aspect, a cooking apparatus includes a cavity unit having a cooking chamber and a rear wall plate with an introduction hole section and a discharge hole section; a door unit on or over the cavity unit, configured to open and close an opening of the cavity unit; a convection heater unit on the rear wall plate, heating air from the cavity unit through the discharge hole section (e.g., entering the convection heater unit from the cooking chamber) and supplying hot air to the cooking chamber through the introduction hole section; and a cooking container including a housing unit having an entrance through which hot air enters, and a support unit on the housing unit and on which one or more cooking objects (e.g., to be cooked by hot air) are placed, wherein the introduction hole section is in a lower part of the rear wall plate, and the discharge hole section is in an upper part of the rear wall plate separate from the introduction hole section.

The cooking container may further include a cover unit that covers the support unit and blocks movement of hot air.

The cooking apparatus may further include a circulation duct unit connected to a discharge hole section in a side wall plate of the cavity unit, configured to guide air discharged through the discharge hole section from the cooking chamber back to the cooking chamber.

The cooking apparatus may further include a discharge opening and closing unit on the side wall plate configured to open and close the discharge hole section in the side wall plate of the cavity unit.

BRIEF DESCRIPTION OF THE DRAWINGS

The above and other aspects, features and other advantages will be more clearly understood from the following detailed description taken in conjunction with the accompanying drawings, in which.

DESCRIPTION OF SPECIFIC EMBODIMENTS

Hereinafter, embodiments of the present invention will be described with reference to accompanying drawings. However, the embodiments are for illustrative purposes only and are not intended to limit the scope of the invention.

Figure 1:
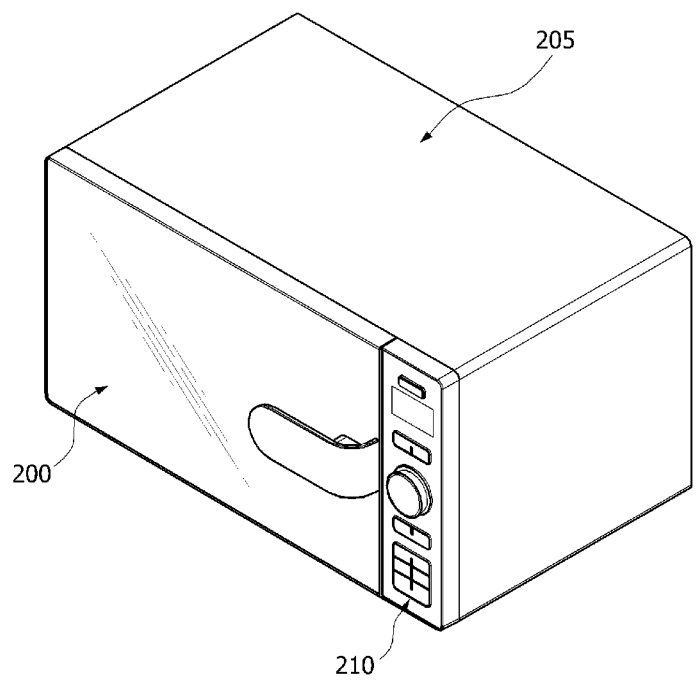
FIG. 1 is a perspective view of an exemplary cooking apparatus in accordance with one or more embodiments of the present disclosure.
Figure 2:
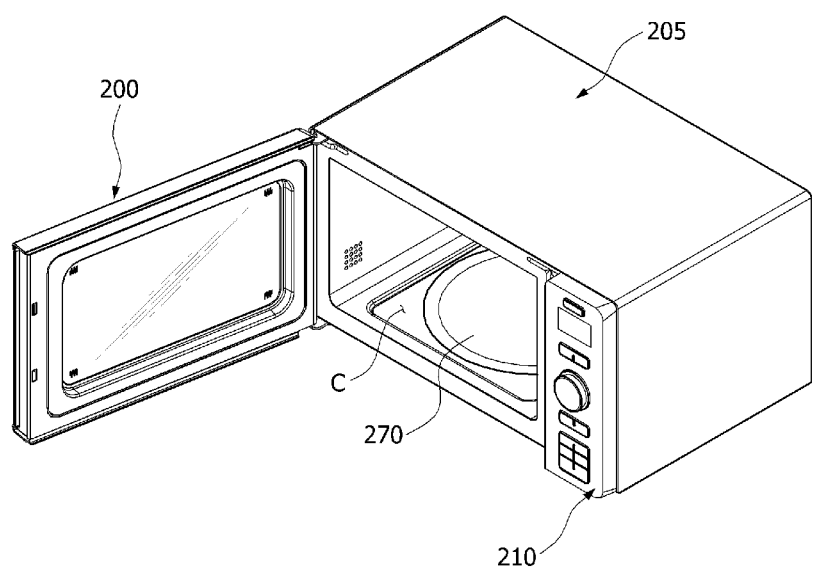
FIG. 2 is a perspective view illustrating an open door unit in the exemplary cooking apparatus in accordance with embodiment(s) of the present disclosure.
Figure 3:
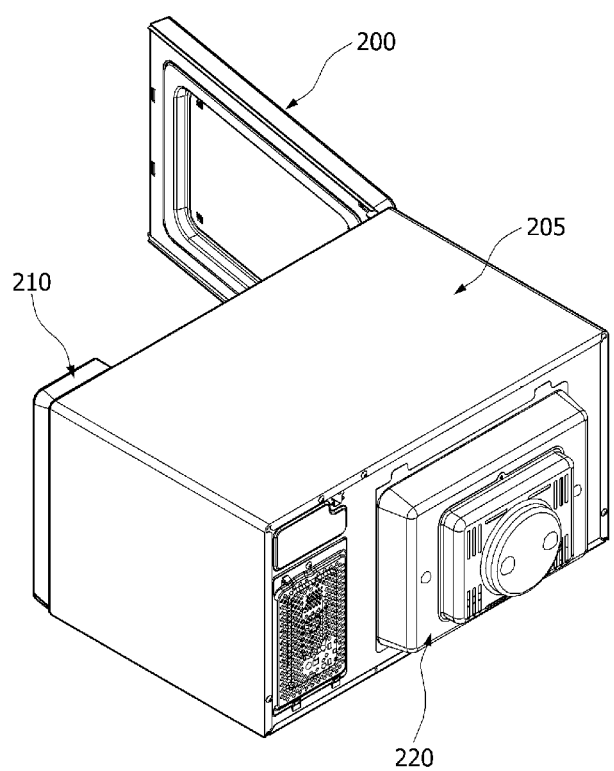
FIG. 3 is a rear perspective view illustrating the state in which the door unit is opened in the cooking apparatus in accordance with embodiment(s) of the present disclosure.
Figure 4:
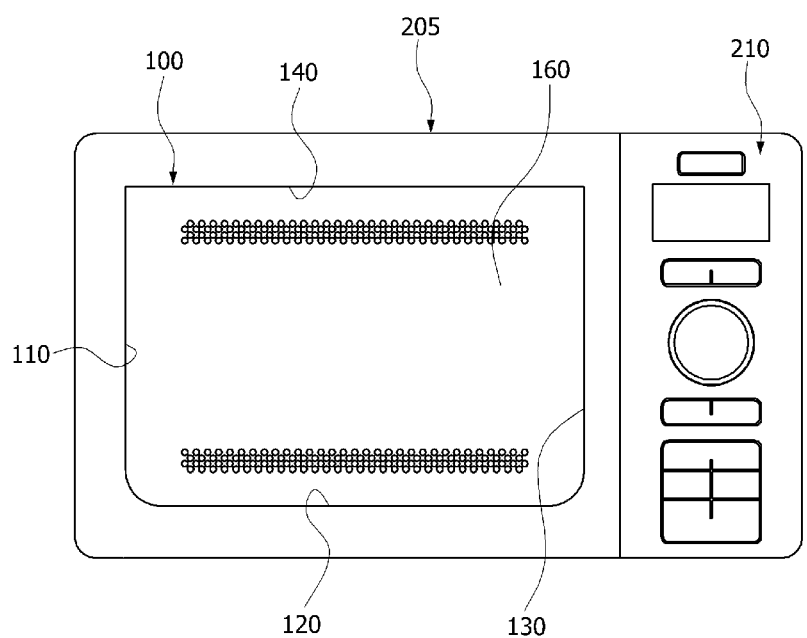
FIG. 4 is a front view schematically illustrating the cooking apparatus in accordance with embodiment(s) of the present disclosure.
Figure 5:
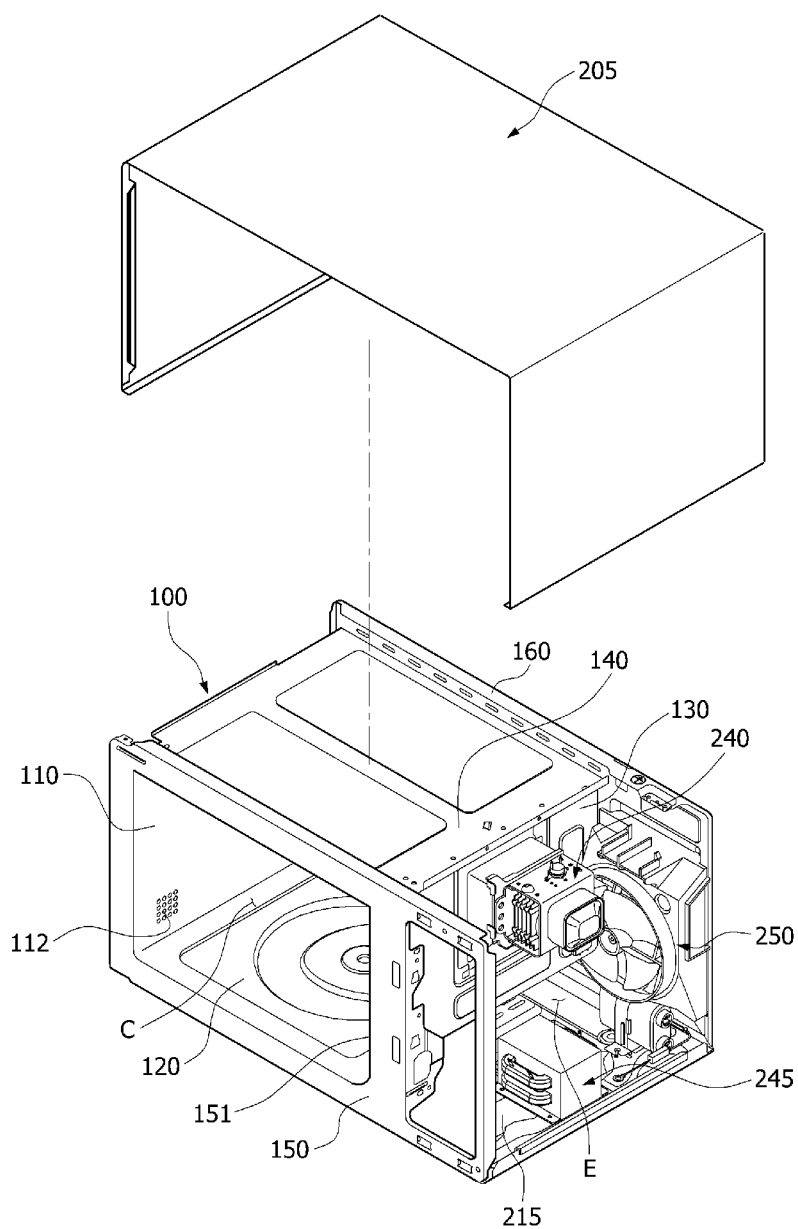
FIG. 5 is a perspective view illustrating a cavity unit and a cabinet unit are exploded in the cooking apparatus in accordance with embodiment(s) of the present disclosure.
Figure 6:
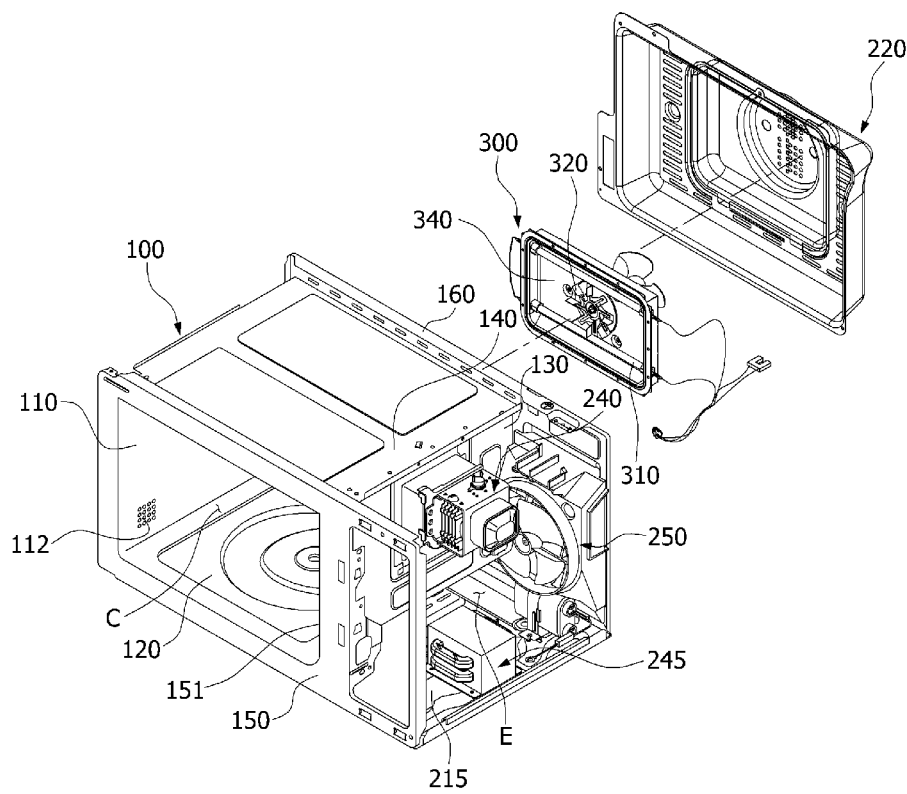
FIG. 6 is a perspective view illustrating an exploded cavity unit and convection heater unit in the exemplary cooking apparatus in accordance with embodiment(s) of the present disclosure.
Figure 7:
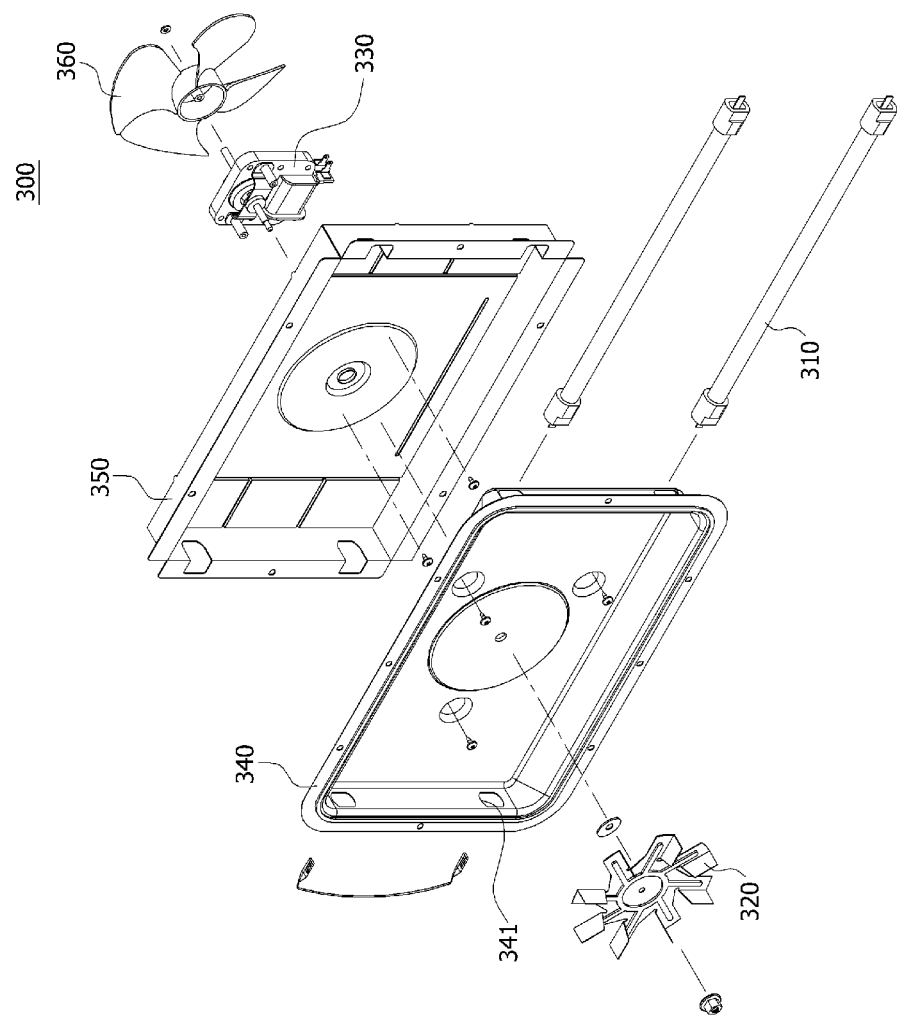
FIG. 7 is an exploded perspective view of the convection heater unit in the exemplary cooking apparatus in accordance with embodiment(s) of the present disclosure.
Figure 8:
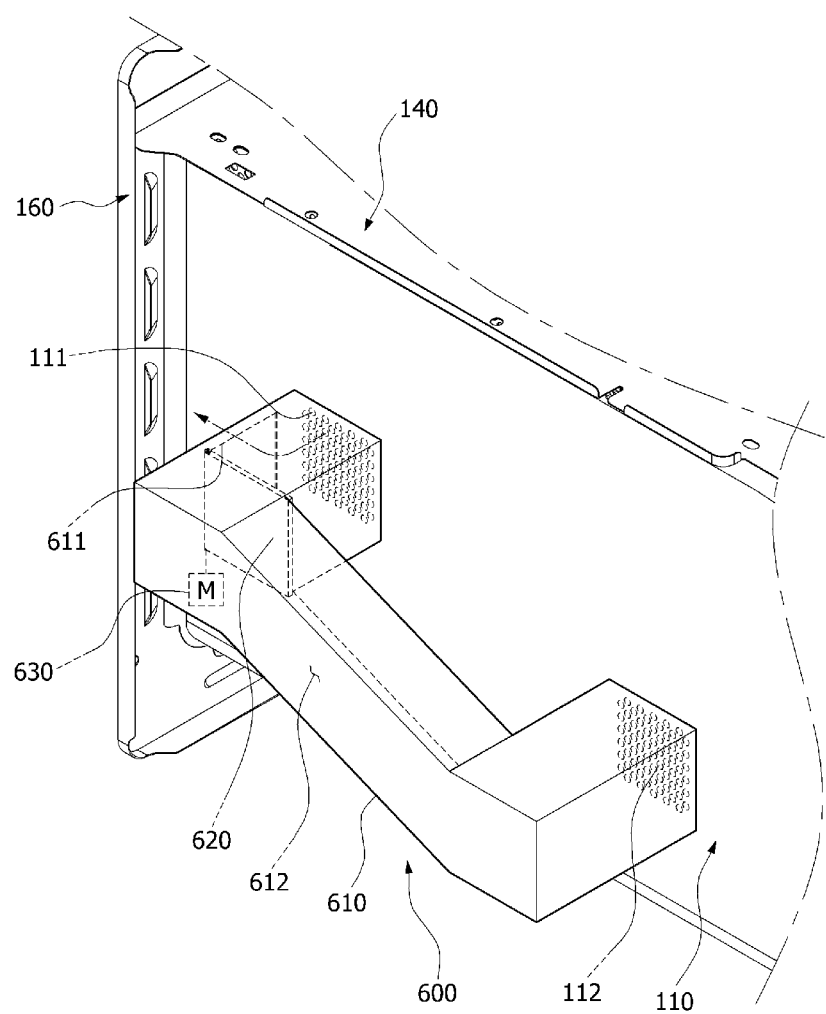
FIG. 8 is a perspective view illustrating an internal flow path of a closed circulation duct unit in the exemplary cooking apparatus in accordance with embodiment(s) of the present disclosure.
Figure 9:
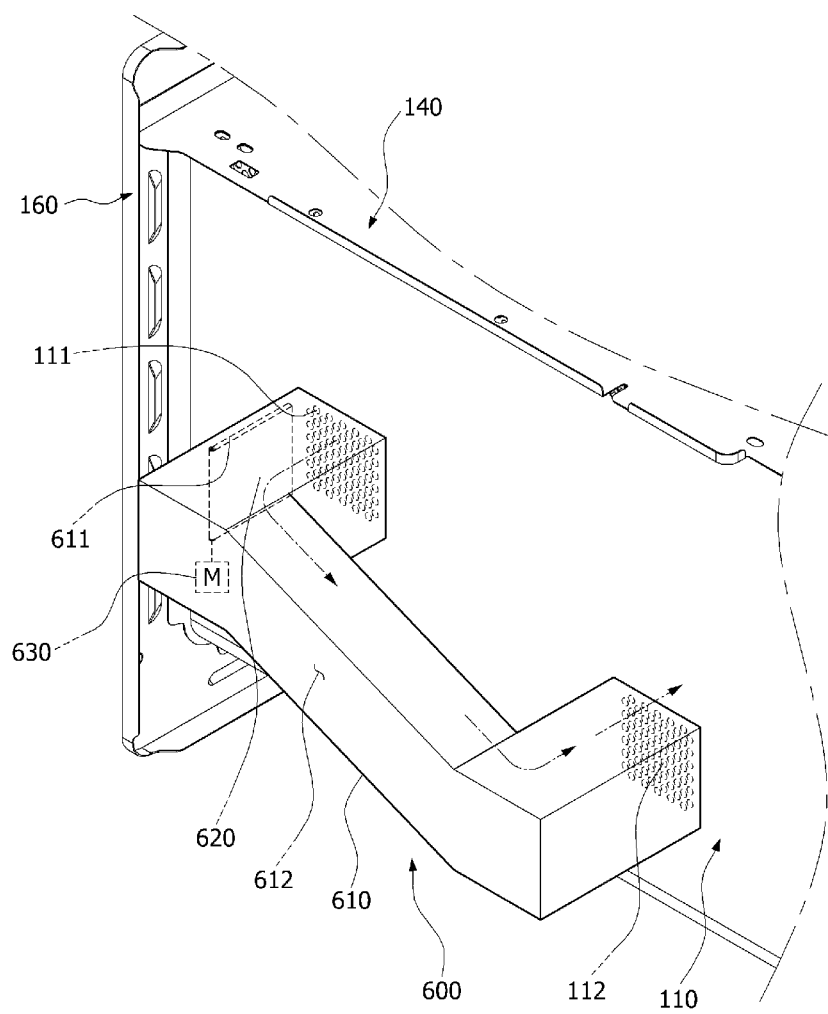
FIG. 9 is a perspective view illustrating an open internal flow path of the circulation duct unit in the exemplary cooking apparatus in accordance with embodiment(s) of the present disclosure.
Figure 10:
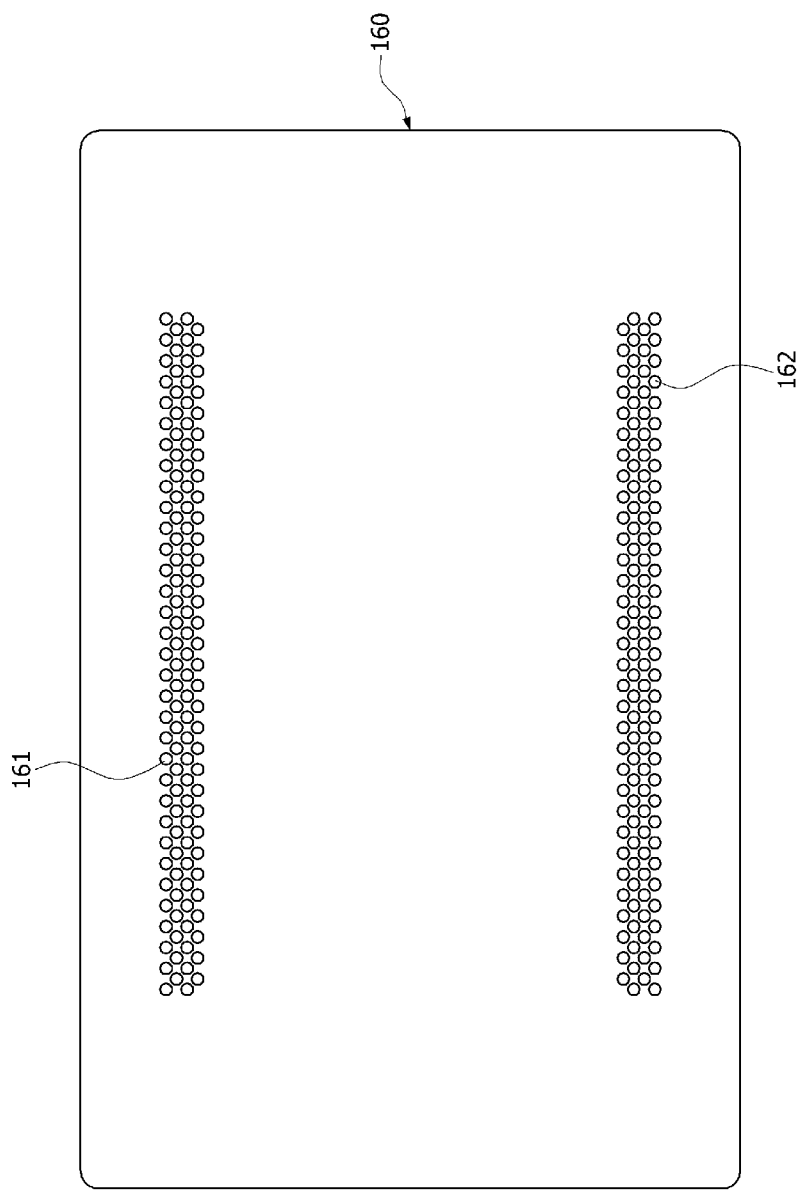
FIG. 10 is a front view illustrating an exemplary rear wall plate in the exemplary cooking apparatus in accordance with embodiment(s) of the present disclosure.
Figure 11:
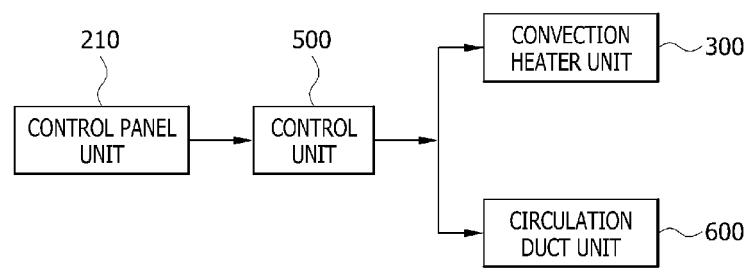
FIG. 11 is a block diagram schematically showing an exemplary control flow for the exemplary cooking apparatus in accordance with embodiment(s) of the present disclosure.

FIG. 1 is a perspective view of an exemplary cooking apparatus in accordance with one or more embodiments of the present disclosure, FIG. 2 is a perspective view illustrating an open door unit in the exemplary cooking apparatus in accordance with embodiment(s) of the present disclosure, FIG. 3 is a rear perspective view illustrating the open door unit in the exemplary cooking apparatus in accordance with embodiment(s) of the present disclosure, and FIG. 4 is a front view schematically illustrating the exemplary cooking apparatus in accordance with embodiment(s) of the present disclosure. FIG. 5 is a perspective view illustrating an exploded cavity unit and cabinet unit in the exemplary cooking apparatus in accordance with embodiment(s) of the present disclosure, FIG. 6 is a perspective view illustrating an exploded cavity unit and convection heater unit in the exemplary cooking apparatus in accordance with embodiment(s) of the present disclosure, and FIG. 7 is an exploded perspective view of the convection heater unit in the exemplary cooking apparatus in accordance with embodiment(s) of the present disclosure. FIG. 8 is a perspective view illustrating an internal flow path of a closed circulation duct unit in the exemplary cooking apparatus in accordance with embodiment(s) of the present disclosure, and FIG. 9 is a perspective view illustrating an open internal flow path of the circulation duct unit in the exemplary cooking apparatus in accordance with embodiment(s) of the present disclosure. FIG. 10 is a front view illustrating a rear wall plate in the exemplary cooking apparatus in accordance with embodiment(s) of the present disclosure, and FIG. 11 is a block diagram schematically showing an exemplary control flow for the exemplary cooking apparatus in accordance with embodiment of the present disclosure.

Referring to FIGS. 1 to 3, 6 and 11, a cooking apparatus in accordance with one or more embodiments of the present disclosure includes a cavity unit 100, a door unit 200, a cabinet unit 205, a convection heater unit 300, and a control unit 500.

Referring to FIGS. 2 and 4 to 6, the cavity unit 100 includes a cooking chamber C therein. Accordingly, a cooking object 60 may be put into and taken out of the cooking chamber C through the opening of the cavity unit 100, and may be cooked in the state in which it is put into the cooking chamber C.

The cavity unit 100 includes a left wall plate 110 which forms a left surface (e.g., of the cavity unit 100), a bottom wall plate 120 which forms a bottom surface (e.g., of the cavity unit 100), a right wall plate 130 which forms a right surface (e.g., of the cavity unit 100), a top wall plate 140 which forms a top surface (e.g., of the cavity unit 100), a front wall plate 150 which forms a front surface (e.g., of the cooking apparatus), and a rear wall plate 160 which forms a rear surface (e.g., of the cavity 100 and/or the cooking apparatus).

While the left wall plate 110, the bottom wall plate 120 and the right wall plate 130 may be integral with one another, the present disclosure is not limited to such an arrangement, and it is to be noted that the left wall plate 110, the bottom wall plate 120 and the right wall plate 130 may be separately formed and then integrally assembled with one another by locking members such as screws, tongue-and-groove configurations, or welds.

Referring to FIGS. 8 and 9, a discharge hole section 111 may be in the left wall plate 110. Air in the cooking chamber C may be discharged outside of the cooking chamber C through the discharge hole section 111.

Due to discharge of air through the discharge hole section 111, in general cooking, it is possible to prevent a temperature inside the cooking chamber C from rising excessively and filling the inside of the cooking chamber C with steam or smoke. In this way, due to the presence of the discharge hole section 111, the cooking apparatus may stably carry out a general cooking operation.

Referring to FIGS. 2 and 4 to 6, a base section 215 which forms the base of the cooking apparatus is below the bottom wall plate 120. The base section 215 is detachably coupled to the bottom wall plate 120 by locking members, and the like.

A rotation plate driving section (not shown) is in the space between the bottom wall plate 120 and the base section 215. The rotation plate driving section is coupled to a rotation plate 270 over the bottom wall plate 120 and/or in the chamber C, by a shaft through the bottom wall plate 120. Accordingly, the rotation plate 270 is rotated by the rotation plate driving section.

The rotation plate 270 constitutes or comprises a flat circular plate, and a cooking container 1, 2, 3 or 4 may be placed on the rotation plate 270.

A suction mechanism (not shown) may be in, on, behind or provided to the right wall plate 130. In one embodiment, the suction mechanism comprises a fan and a motor configured to rotate the fan. Air outside the cooking chamber C enters the cooking chamber C through the suction mechanism. Due to the introduction of air through the suction mechanism, in general cooking, air inside the cooking chamber C may be smoothly discharged outside of the cooking chamber C through the discharge hole section 111.

The top wall plate 140 is coupled to the left wall plate 110 and the right wall plate 130 by locking members such as screws, tongue-and-groove configurations, or welds.

The front wall plate 150 is coupled to the front ends of the left wall plate 110, the bottom wall plate 120, the right wall plate 130 and the top wall plate 140. A front wall hole section 151 which communicates with the cooking chamber C is in the front wall plate 150.

A control panel unit 210 is mounted, attached or affixed to the front wall plate 150. In one example, the control panel unit 210 is on one side (e.g., the right part) of the front wall plate 150, and the door unit 200 over the front wall hole section 151 is on an opposite side (e.g., the left part) of the front wall plate 150.

The control panel unit 210 includes one or more control buttons configured to select and/or initiate various cooking functions of the cooking apparatus, including a power switch. If a control button is pressed, a select signal is transferred to the control unit 500, and a selected cooking function is carried out.

FIGS. 4 and 10 show an introduction hole section 162 configured to supply air into the cooking chamber C and a discharge hole section 161 configured to discharge air from the cooking chamber C toward the convection heater unit 300 in the rear wall plate 160.

In one embodiment, the introduction hole section 162 is in the lower part of the rear wall plate 160, and the discharge hole section 161 is in the upper part of the rear wall plate 160 separate from the introduction hole section 162. The introduction hole section 162 and the discharge hole section 161 are substantially symmetrical with respect to the center of the rear wall plate 160 and/or each other.

The air entering the convection heater unit 300 through the discharge hole section 161 is heated by the convection heater unit 300 and is supplied back to the cooking chamber C through the introduction hole section 162. In this way, since discharge and introduction paths are on opposite sides of the cooking chamber C, and/or are not adjacent to each other, the circulation efficiency of hot air may be improved. In particular, since the introduction hole section 162 may be only in the lower part of the rear wall plate 160, hot air from the convection heater unit 300 may be concentrated in the lower part of the cooking chamber C. This may be associated with and/or beneficial for a cooking container 1, 2, 3 and/or 4 in a cooking apparatus configured for air frying.

The hot air produced by the convection heater unit 300 enters the cooking chamber C through the introduction hole section 162. The introduction hole section 162 comprises a plurality of holes densely arranged or placed at substantially regular intervals in the lower part of the rear wall plate 160. Accordingly, the hot air produced by the convection heater unit 300 may uniformly enter the cooking chamber C without any specific directionality through the introduction hole section 162.

Referring to FIGS. 1 to 5, the door unit 200 is over the cavity unit 100. While it is illustrated that the door unit 200 is hingedly coupled to the front wall plate 150, the present disclosure is not limited to such an arrangement or configuration.

The door unit 200 opens or closes the opening of the cavity unit 100 (e.g., the front wall hole section 151 of the front wall plate 150). When the door unit 200 is opened, a cooking container 1, 2, 3 or 4 may be put into or taken out of the cooking chamber C, and when the door unit 200 is closed, the cooking object 60 may be heated or cooked.

The cabinet unit 205 may form the upper surface and left and right side surfaces of the cooking apparatus, and protects the cavity unit 100 and an electric outfitting room E from external forces and/or circumstances, in cooperation with the front wall plate 150 and the rear wall plate 160. The lower surface of the cooking apparatus comprises the base section 215. The base section 215 is coupled to the bottom wall plate 120, and abutted by the lower end of the cabinet unit 205. The base section 215 protects the lower surface of the cooking apparatus from external forces and/or circumstances.

Referring to FIGS. 6 and 7, the convection heater unit 300 is installed on the rear wall plate 160, and generates heat to be supplied to the cooking chamber C through the introduction hole section. In one or more embodiments, the convection heater unit 300 includes one or more (e.g., a plurality of) convection heaters 310, the convection fan 320, a convection motor 330, and a convection heater cover 340. The convection heater unit 300 may further include a convection insulating cover 350, and a convection cooling fan 360.

The convection heaters 310 are behind the rear wall plate 160, and function as a heat source to generate heat. By the heat generated by the convection heaters 310, the surroundings of the convection heaters 310, and in particular, air in the convection heater cover 340 is heated. Then, the heated air is supplied to the cooking chamber C as hot air by operation of the convection fan 320. In one or more embodiments, a pair of convection heaters 310 are individually above or below the convection fan 320, and/or on opposite sides or ends of the convection heater unit 300.

The convection fan 320 is behind the rear wall plate 160. The convection fan 320 is rotated by the convection motor 330, and moves air in the convection heater cover 340, heated by the convection heaters 310, to the cooking chamber C.

The heated air is supplied to the cooking chamber C through the introduction hole section of the rear wall plate 160. Air in the cooking chamber C moves or is guided back to the convection heater unit 300 through the discharge hole section 165 (e.g., by the air flow within the cooking chamber C), where it is heated by the convection heaters 310 and supplied back to the cooking chamber C through the introduction hole section.

The convection motor 330 is coupled to the convection fan 320 and the convection cooling fan 360, and serves as a power source for providing power. The convection motor 330 is also generally configured to rotate the convection fan 320 and the convection cooling fan 360. The convection heater cover 340 and the convection insulating cover 350 are between the convection motor 330 and the convection heaters 310.

In this arrangement or configuration, it is possible to prevent the heat generated by the convection heaters 310 from influencing or adversely affecting the convection motor 330. The power transfer shaft of the convection motor 330 is coupled to the convection fan 320 through the convection heater cover 340 and the convection insulating cover 350.

The convection heater cover 340 is mounted, affixed, attached or secured to the rear wall plate 160 by locking members such as screws or welds, to cover the convection heaters 310 and the convection fan 320. Convection heater mounting holes 341 through which the convection heaters 310 are placed may be in the convection heater cover 340. The convection heater cover 340 defines a space with a predetermined size between it and the rear wall plate 160. Accordingly, air in the space within the convection heater cover 340 may be heated by operation of the convection heaters 310.

The convection insulating cover 350 is coupled to the rear wall 160 and/or the convection heater cover 340 by locking members such as screws, tongue-and-groove configurations, welds, or an adhesive, while covering the convection heater cover 340. The convection heater cover 340 and the convection insulating cover 350 may be independently coupled to each other by locking members such as screws, tongue-and-groove configurations, or an adhesive.

The convection insulating cover 350 includes an insulating material (e.g., a material with an excellent insulation property, such as a ceramic, an insulating fiber-based insulator sheet such as fiberglass, etc.). Therefore, it is possible to restrain or prevent the heat from the convection heaters 310 from radiating or escaping outside of the convection insulating cover 350 to the back of the cooking apparatus.

The convection cooling fan 360 is coupled to the convection motor 330. The convection cooling fan 360 may rotate in an interlocked manner when the convection motor 330 operates. As a result, heat generated by the convection motor 330 may be cooled by the convection cooling fan 360. Outside air directed to the convection motor 330 by the convection cooling fan 360 may be discharged outside the cooking apparatus through a hole section in the back cover 220.

As the convection insulating cover 350 is in front of the convection motor 330 and the convection cooling fan 360 is behind the convection motor 330, it is possible to prevent the degradation of the convection motor 330 by the heat generated by the convection heaters 310 or the convection motor 330 itself.

In one or more embodiments, since the convection fan 320 and the convection cooling fan 360 may be simultaneously, sequentially and/or independently rotated using one convection motor 330, the forward and rearward length (e.g., the depth) of the cooking apparatus may be decreased or minimized, and the manufacturing cost may be reduced.

The convection heater unit 300 is covered by the back cover 220. The back cover 220 may cover the entire convection heater unit 300 including the convection motor 330 and the convection cooling fan 360, and may be detachably coupled to the rear wall plate 160 using locking members such as screws or a tongue-and-groove configuration.

Using the convection heater unit 300, air heated in the convection heater cover 340 is immediately supplied to the cooking chamber C. As a result, the cooking time may be reduced due to the direct contact between the cooking object(s) and the hot air, and cooking performance may improve.

Referring to FIGS. 8, 9 and 11, the cooking apparatus in accordance with one or more embodiments of the present disclosure may further include a circulation duct unit 600.

The circulation duct unit 600 may be connected to the discharge hole section 111 of the left wall plate 110, and is configured to guide the air discharged out of the cooking chamber C through the discharge hole section 111 back to the cooking chamber C.

The circulation duct unit 600 may include a circulation duct 610 and a duct opening and closing section 620. The circulation duct 610 may have a duct-like shape (e.g., with a substantially square, rectangular, circular, oval, etc. cross-section) and an internal flow path 612. The circulation duct 610 may be mounted, affixed, or attached to, or integrated with, the outer surface of the left wall plate 110 (e.g., to the left wall plate 110 outside the cooking chamber C).

One end of the circulation duct 610 is connected to and/or overlapping the discharge hole section 111, and another end of the circulation duct 610 is connected to and/or overlapping a suction hole section 112. Accordingly, the air discharged through the discharge hole section 111 may be guided to the suction hole section 112 along the internal flow path 612 of the circulation duct 610.

A discharge opening 611 may be in the circulation duct 610. The discharge opening 611 may be on one sidewall of the circulation duct 610 adjacent to the discharge hole section 111. Accordingly, the air discharged through the discharge hole section 111 may be discharged out of the circulation duct 610 through the discharge opening 611.

In this way, when air in the cooking chamber C enters the circulation duct 610 through the discharge hole section 111, air may be guided back into the cooking chamber C along the internal flow path 612 or may be discharged out of the circulation duct 610 through the discharge opening 611. Such air flow depends on the duct opening and closing section 620 in the circulation duct 610.

The duct opening and closing section 620 is rotatable and configured to open and close the internal flow path 612 of the circulation duct 610. The duct opening and closing section 620 may be coupled to the circulation duct 610 using one or more hinges, and may be coupled to a duct driving section 630 outside the circulation duct 610. Accordingly, as the duct opening and closing section 620 is rotated by the duct driving section 630, the duct opening and closing section 620 opens or closes the internal flow path 612 of the circulation duct 610. The duct opening and closing section 620 is adjacent to the discharge opening 611 and is capable of opening and closing (and/or configured to open and close) the discharge opening 611.

In the case where the duct opening and closing section 620 opens the internal flow path 612 of the circulation duct 610, the duct opening and closing section 620 may close the discharge opening 611. That is to say, the opening of the internal flow path 612 and the closing of the discharge opening 611 may be simultaneously implemented through only the operation of the duct opening and closing section 620. Thus, when air in the cooking chamber C enters the circulation duct 610 through the discharge hole section 111, air is naturally supplied back to the cooking chamber C through the internal flow path 612.

The control unit 500 operates the duct opening and closing section 620 to open the internal flow path 612 of the circulation duct 610 in frying mode. Accordingly, since the air discharged out of the cooking chamber C through the discharge hole section 111 is circulated back to the cooking chamber C through the suction hole section 112, heat loss may be suppressed or minimized as a result of discharging the air in the cooking chamber C.

In the present invention, a cooking object is fried using the fat or fat constituent in the cooking object itself. Alternatively, if desired, the cooking object may be sprayed or at least partially coated with a very small or light amount of oil prior to frying. In frying, the cooking object is placed in the cooking container 1, 2, 3 or 4 which may be for air frying (e.g., configured to fry the cooking object with hot air), using at least one of the heater units 300 and 700. Accordingly, in one or more embodiments, frying may be referred to as "air frying."

One of the discharge hole section 111 and the suction hole section 112 may be in the upper part of the side wall plate 110 and/or 130, and the other of the discharge hole section 111 and the suction hole section 112 may be in the lower part of the side wall plate 110 and/or 130. In one or more embodiments, the discharge hole section 111 is in the upper part of the left wall plate 110, and the suction hole section 112 is in the lower part of the left wall plate 110. Since air in the cooking chamber C is discharged through the upper discharge hole section 111, and air is introduced into the cooking chamber C through the lower suction hole section 112, air circulation efficiency, in particular, the upward and/or downward circulation efficiency in the cooking chamber C, may be improved through the discharge and introduction of air through the discharge hole section 111 and the suction hole section 112, respectively. Hence, as air circulation is actively implemented in the cooking chamber C, the cooking time of the cooking object(s) may be reduced or reduced or shortened, and the cooking performance may be improved.

One of the discharge hole section 111 and the suction hole section 112 may be in the front part of the side wall plate 110 and/or 130, and the other of the discharge hole section 111 and the suction hole section 112 may be in the rear part of the side wall plate 110 and/or 130. In one or more embodiments, the discharge hole section 111 is in the rear part of the left wall plate 110, and the suction hole section 112 is in the front part of the left wall plate 110. Since air in the cooking chamber C is discharged through the rear discharge hole section 111, and air enter the cooking chamber C through the front suction hole section 112, air circulation efficiency, in particular, the upward and downward circulation efficiency in the cooking chamber C, may be improved through the discharge and introduction of air through the discharge hole section 111 and the suction hole section 112, respectively. Hence, as air circulation is actively implemented in the cooking chamber C, the cooking time of the cooking object (s) may be reduced or shortened, and the cooking performance may be improved.

In the case where the duct opening and closing section 620 closes the internal flow path 612 of the circulation duct 610, the duct opening and closing section 620 may operate to open the discharge opening 611. That is to say, the closing of the internal flow path 612 and the opening of the discharge opening 611 may be simultaneously implemented through the operation of the duct opening and closing section 620. Thus, when air in the cooking chamber C enters the circulation duct 610 through the discharge hole section 111, air is naturally discharged outside of the circulation duct 610 through the discharge opening 611.

The control unit 500 closes the duct opening and closing section 620 (and the internal flow path 612 of the circulation duct 610) in the general cooking mode. Accordingly, the air discharged out of the cooking chamber C through the discharge hole section 111 is discharged outside of the circulation duct 610 through the discharge opening 611. Due to the discharge of air from the cooking chamber C by the discharge hole section 111 and the discharge opening 611 in this way, it is possible to prevent the temperature inside the cooking chamber C from rising excessively and/or filling the inside of the cooking chamber C with steam or smoke in the general cooking mode.

Referring to FIGS. 5 and 6, in the electric outfitting room E, there is a magnetron 240 that generates microwaves, a high voltage transformer 245 configured to supplying a high voltage to the magnetron 240, and a cooling fan section 250 configured to cooling various electric parts in the electric outfitting room E.

As is apparent from the above descriptions, in the cooking apparatus in accordance with embodiment(s) of the present disclosure, since not only general cooking but also frying, that is, air frying, may be carried out by one cooking apparatus, user convenience may be improved.

Also, in the cooking apparatus in accordance with embodiment(s) of the present disclosure, since frying may be carried out using the fat in the cooking object(s) without any need to separately supply oil to or on the cooking object(s), it is possible to prevent or reduce the likelihood of a safety-related accident due to oil having a high temperature, and the cooking cost may be reduced due to nonuse of oil.

Further, in the cooking apparatus in accordance with embodiment(s) of the present disclosure, since frying may be immediately carried out through heater units without the need to move or turn the cooking object(s), optionally after defrosting the cooking object(s) using microwaves, user convenience may be improved.

Moreover, in the cooking apparatus in accordance with embodiment(s) of the present disclosure, since frying as a main cooking mode may be carried out using hot air from heater units, optionally after provisionally, initially and/or partially cooking the cooking object(s) using microwaves, the inside and the outside of the cooking object(s) may be evenly cooked, and a crispy texture may be realized.

Figure 12:
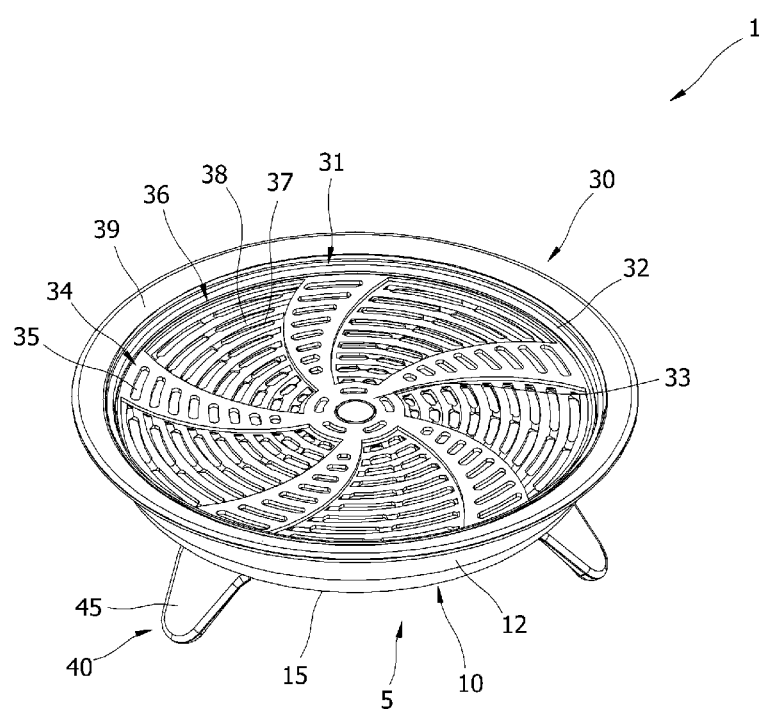
FIG. 12 is a perspective view of an exemplary cooking container for a cooking apparatus in accordance with a first embodiment of the present disclosure.
Figure 13:
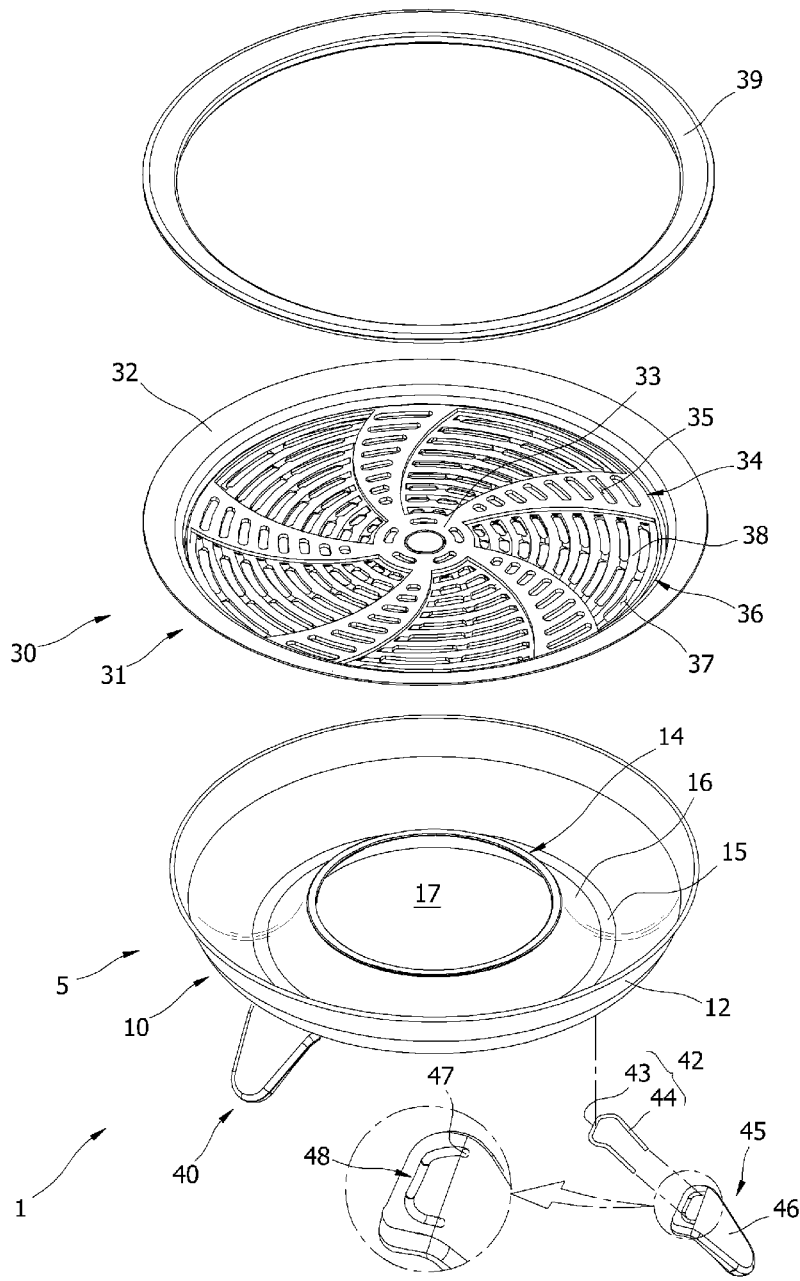
FIG. 13 is an exploded perspective view of the exemplary cooking container for a cooking apparatus in accordance with embodiment(s) of the present disclosure.
Figure 14:
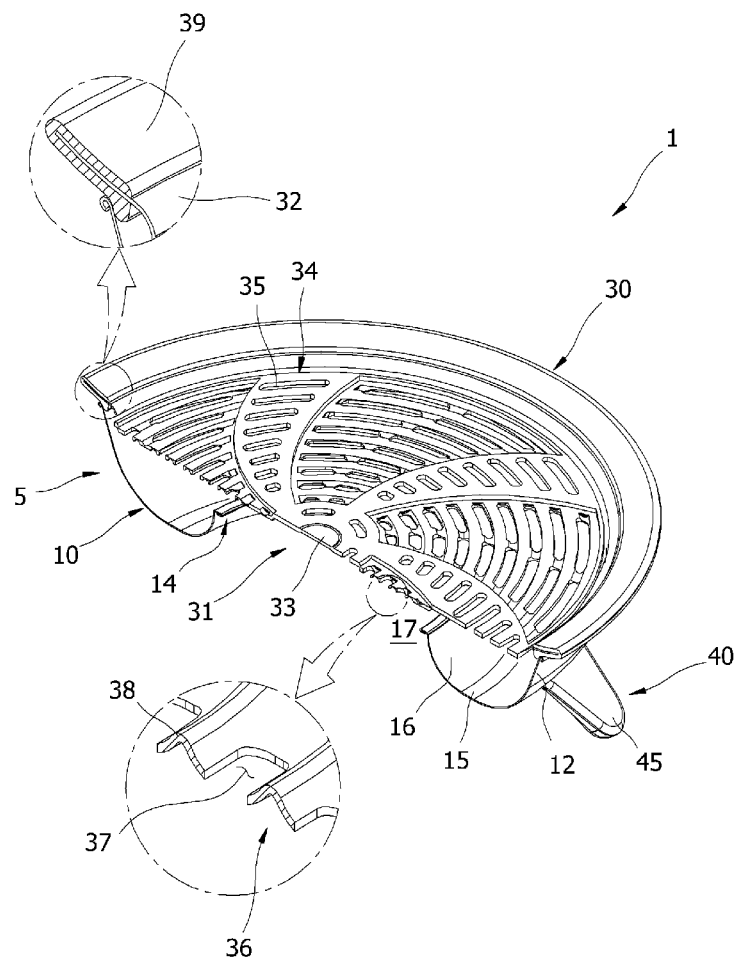
FIG. 14 is a cut-away perspective view of the exemplary cooking container for a cooking apparatus in accordance with embodiment(s) of the present disclosure.
Figure 15:
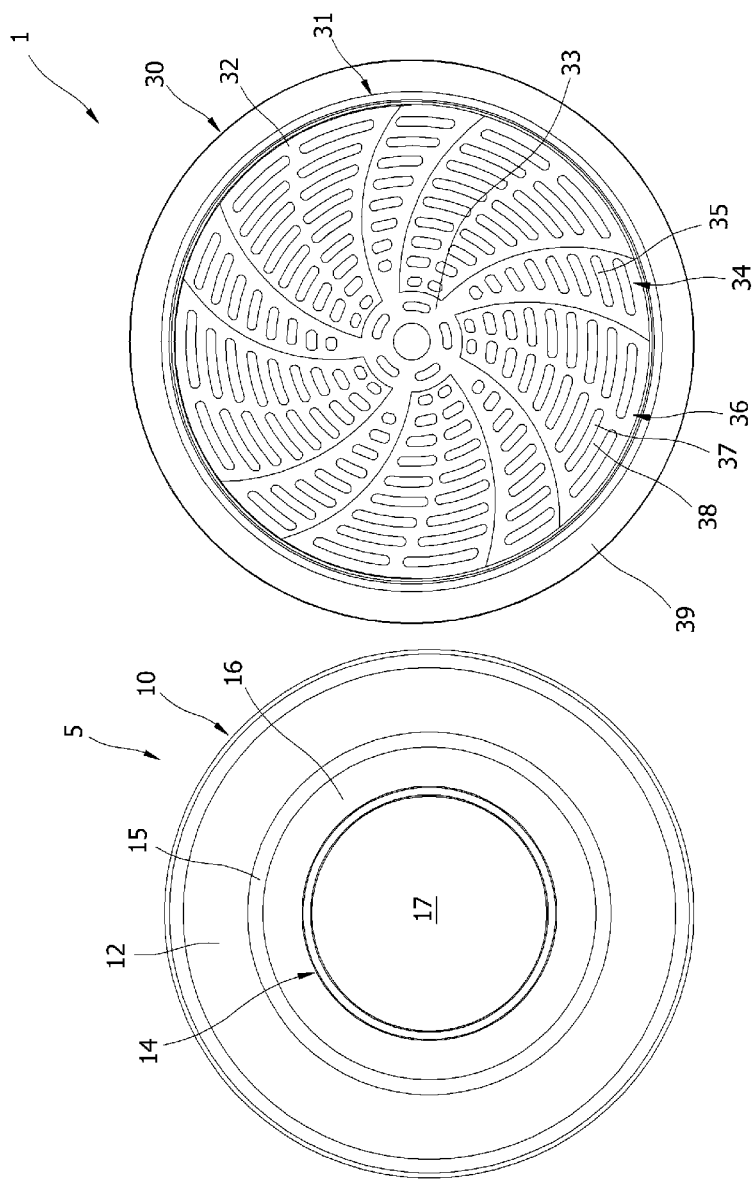
FIG. 15 is a plan view illustrating an exploded housing body and support unit in the exemplary cooking container for a cooking apparatus in accordance with embodiment(s) of the present disclosure.
Figure 16:
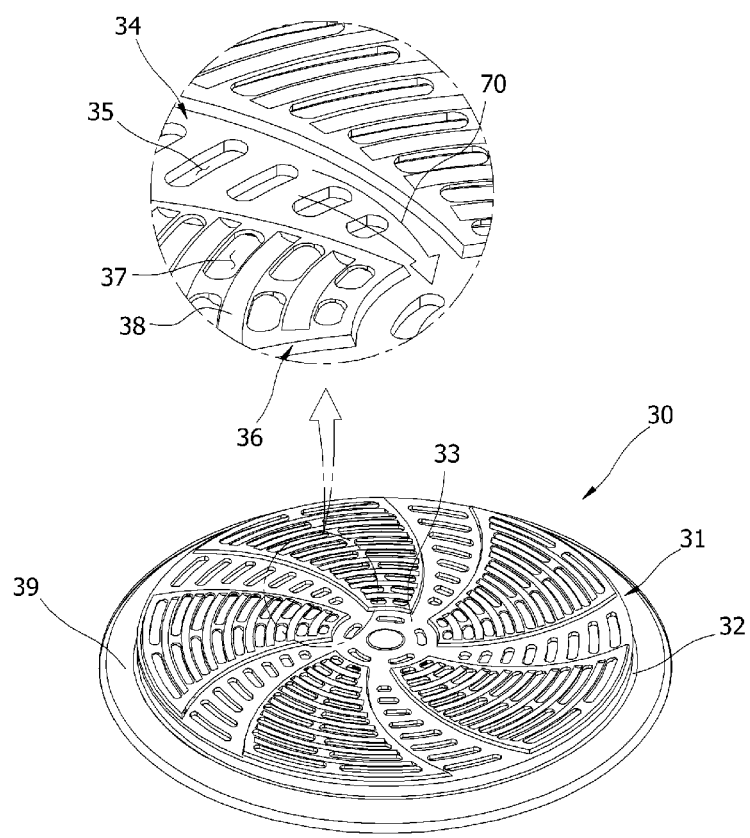
FIG. 16 is a perspective view illustrating the rear surface of the support unit in the exemplary cooking container for a cooking apparatus in accordance with embodiment(s) of the present disclosure.
Figure 17:
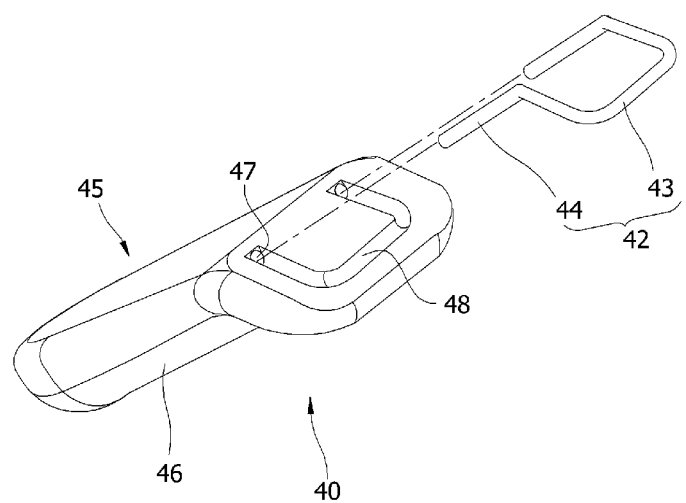
FIG. 17 is an exploded perspective view illustrating an exemplary leg for the exemplary cooking container in accordance with embodiment(s) of the present disclosure.
Figure 18:
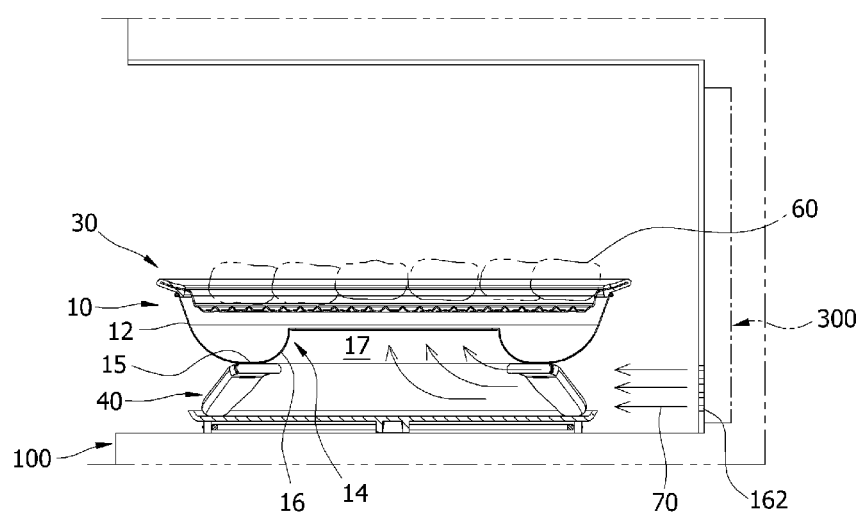
FIG. 18 is a view illustrating a use of the exemplary cooking container for frying in accordance with embodiment(s) of the present disclosure in a cooking apparatus.
Figure 19:
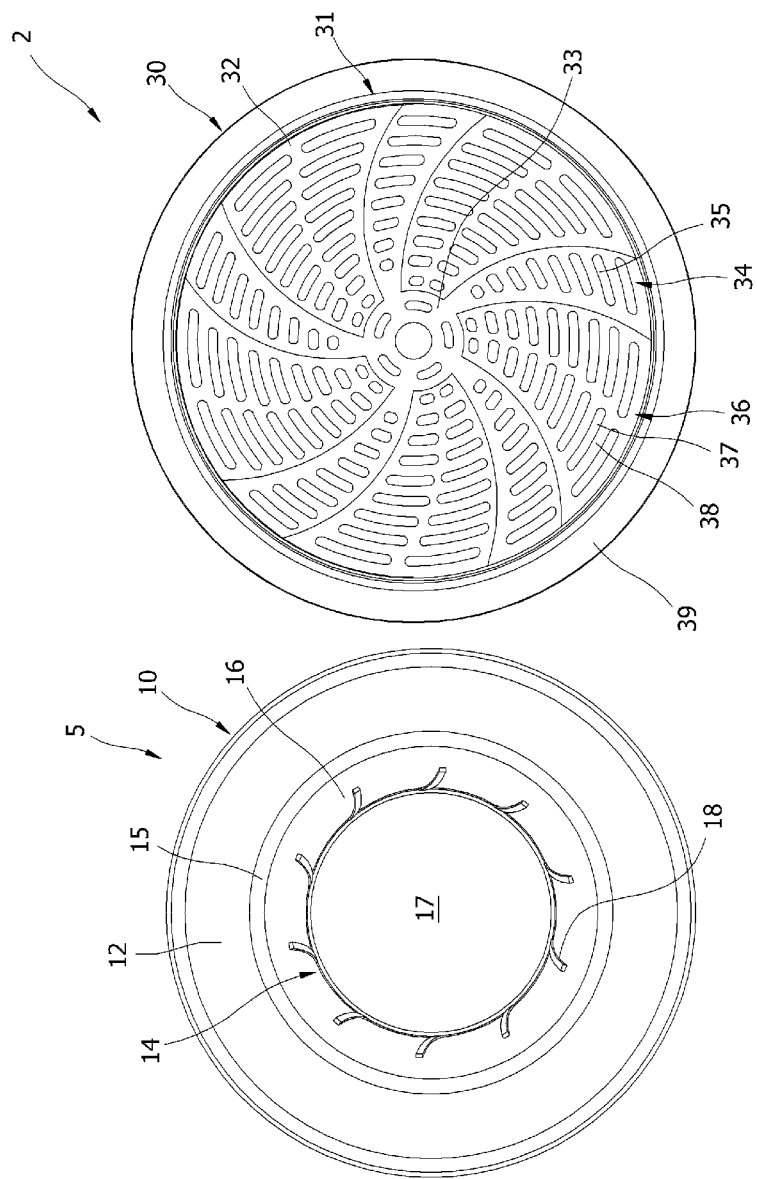
FIG. 19 is a plan view illustrating a variation of the housing body in an exemplary cooking container for a cooking apparatus in accordance with embodiment(s) of the present disclosure.
Figure 20:
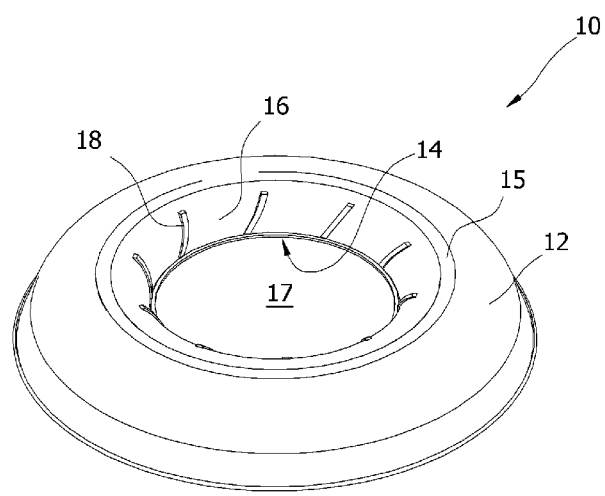
FIG. 20 is a perspective view illustrating the variation of the housing body of FIG. 23 in the exemplary cooking container for a cooking apparatus in accordance with embodiment(s) of the present disclosure.

FIG. 12 is a perspective view of an exemplary cooking container for a cooking apparatus in accordance with one or more embodiments of the present disclosure, FIG. 13 is an exploded perspective view of the exemplary cooking container in accordance with embodiment(s) of the present disclosure, and FIG. 14 is a broken-away perspective view of the exemplary cooking container in accordance with embodiment(s) of the present disclosure. FIG. 15 is a plan view illustrating an exploded housing body and support unit in the exemplary cooking container in accordance with embodiment(s) of the present disclosure, FIG. 16 is a perspective view illustrating the rear surface of the support unit in the exemplary cooking container for a cooking apparatus in accordance with embodiment(s) of the present disclosure, and FIG. 17 is an exploded perspective view illustrating a leg of the exemplary cooking container for a cooking apparatus in accordance with embodiment(s) of the present disclosure. FIG. 18 is a view illustrating the exemplary cooking container in a cooking apparatus in the frying mode in accordance with embodiment(s) of the present disclosure. FIG. 19 is a plan view illustrating a variation of the housing body in the exemplary cooking container in accordance with embodiment(s) of the present disclosure, and FIG. 20 is a perspective view illustrating the variation of the housing body in the exemplary cooking container in accordance with embodiment(s) of the present disclosure.

Referring to FIGS. 12, 13 and 18, a cooking container 1 for a cooking apparatus in accordance with one or more embodiments of the present disclosure includes a housing unit 5 which has an entrance 14 through which hot air 70 passes, and a support unit 30 on the housing unit 5 and on which one or more cooking objects 60 to be cooked by the hot air 70 is placed.

The cooking object(s) 60 are placed on the support unit 30, and the housing unit 5 is under the support unit 30. Since the housing unit 5 which supports the support unit 30 has a central entrance 14, the hot air 70 may enter the housing unit 5 through the entrance 14.

The housing unit 5 may have one or more of a variety of shapes without departing from a technical concept that it defines air flow paths for the hot air 70 supplied through the entrance 14 to heat the cooking object(s) 60 on the support unit 30.

Referring to FIGS. 13 to 15 and 18, the housing unit 5 includes a housing body 10 with the entrance 14 at a lower portion and/or center thereof. The housing unit 5 is opened at the uppermost end or surface thereof, and further includes leg sections (legs) 40 which support the housing body 10. The leg sections 40 which extend downward from the housing body 10 are placed on a rotation plate 270 or a bottom portion or lowermost horizontal surface of a cooking apparatus (e.g., in the cooking chamber).

The entrance 14 is at the lower portion or underside of the housing body 10, and the hot air 70 flowing from a side of the cooking container 1 (e.g., substantially at the level of the lower introduction hole section 162) enters the lower portion of the housing body 10 and flows toward the upper portion of the housing body 10.

A space under the housing body 10 exists because the housing body 10 is supported by the leg sections 40. As a result, the flow of air moving to the inside of the housing body 10 through the lower portion of the housing body 10 may be smoothly implemented.

The housing body 10 includes a housing side section 12, the entrance 14, a housing bottom section 15, a housing inside section 16, an introduction space 17, and optional guide projections 18.

The housing side section 12 supports the periphery of the support unit 30 and has a shape which extends downward. When viewed from the top, the housing side section 12 which forms the side surface of the housing body 10 has a circular or ring shape, and when viewed from the side, has a rounded contour or curved cross-section, which may be rounded from the uppermost end or surface to the lowermost end or surface of the housing side section 12.

Since the housing side section 12 has a rounded contour and curves inwardly towards the housing body 10 in a downward direction, the hot air 70 flowing from the side of the housing body 10 toward the housing side section 12 may be guided downward towards the underside of the housing side section 12, whereby the cooking time may be reduced or shortened.

That is, since the housing side section 12 is sloped and/or has a rounded shape, the hot air 70 supplied in a sideward direction towards the housing body 10 may be easily introduced into the housing body 10 through the entrance 14 at a lower portion or underside of the housing body 10, the amount of hot air 70 flowing into the entrance 14 may be increased, by which loss of hot air 70 may be reduced.

The housing bottom section 15 connected to and/or integral with the lowermost end or surface of the housing side section 12 extends inwardly from the lowermost end or surface of the housing side section 12. The housing bottom section 15 extends horizontally from the lowermost end or surface of the housing side section 12 and has an annular shape. The leg sections 40 are fixed to the lowermost surface of the housing bottom section 15.

Since the leg sections 40 are abutted on the housing bottom section 15 which extends horizontally, the contact area between the leg sections 40 and the housing bottom section 15 may be increased or maximized, by which fixing or securing the leg sections 40 to the housing body 10 may be stably implemented.

The housing inside section 16 which extends upward from the housing bottom section 15 defines, at the uppermost end or surface thereof, the entrance 14 through which the hot air 70 enters the cooking container 1. The introduction space 17 which communicates with the entrance 14 is in the housing inside section 16. The housing inside section 16 which defines the introduction space 17 has a convex curved shape.

Because the introduction space 17 is under the entrance 14, and the housing inside section 16 defining the introduction space 17 has a convex curved shape, the flow of hot air 70 through the housing inside section 16 to the entrance 14 may be stably implemented.

Since the housing inside section 16 may have a funnel shape (or inverse funnel shape) which decreases with distance from the surface on which the cooking container 1 is placed, the hot air 70 which flows upward through the housing inside section 16 may smoothly enter the housing body 10 through the entrance 14.

The uppermost end or surface of the housing body 10 in accordance with various embodiments is at a position and/or height (e.g., a distance from the bottom wall 120 of the cooking chamber C) the same as or higher than the lower introduction hole section 162 through which the hot air 70 is discharged toward the side of the housing body 10. As a result, the hot air 70 may be easily supplied into the housing body 10 through the lower end or underside of the housing body 10.

The height of the holes which are at the upper end of the lower introduction hole section 162 may be the same as or lower than the height of the uppermost end or surface of the housing body 10. When the height of the lower introduction hole section 162 is less than or below the housing body 10, the hot air 70 flows to the entrance 14 through the lower end or underside of the housing body 10.

Since the hot air 70 flowing through the entrance 14 is hotter than the surrounding air, it moves upward (e.g., by convection). Therefore, the hot air 70 flowing towards the entrance 14 by inertia when discharged from the convection heater unit 300 flows toward the uppermost end or surface of the housing body 10 due to convection (e.g., natural movement upward), and heats the cooking object(s) 60.

The hot air 70 that does not flow upward through the entrance 14, but flows upward obliquely from the underside of the cooking container 1, comes into contact with the rounded surface of the housing inside section 16 and then flows upward toward the entrance 14. Accordingly, most of the hot air 70 supplied to the lower end or underside of the housing body 10 flows upward through the entrance 14.

When the height of the holes at the upper end of the lower introduction hole section 162 is the same as or lower than the height of the uppermost end or surface of the housing body 10, a downward flow of the hot air 70 is guided along the curved surface of the side of the housing body 10.

In other words, a portion of the hot air 70 that flows horizontally through the lower introduction hole section 162 flows to the entrance 14 through the lower end or underside of the housing body 10, and the remaining portion of the hot air 70 flows to the lowermost end or surface of the housing side section 12 along the curved surface of the housing side section 12 and joins to the hot air 70 that enters the entrance 14 from the lowermost end or surface of the housing side section 12.

The housing body 10 may comprise a steel or aluminum body (which may be integrated or a single piece), with an optional coating of a low-stick or non-stick material such as Teflon or polycarbonate thereon. Stainless steel may also be used for the housing body 10, optionally without a coating thereon.

FIGS. 19 and 20 show a variation of the housing body 10, in which separate guide projections 18 may be on the housing inside section 16 to guide the rotational movement of the hot air 70.

The guide projections 18, which may have a spiral or curved shape on the surface of the housing inside section 16 facing the introduction space 17, perform a guiding function, and the hot air 70 flowing toward the entrance 14 through the introduction space 17 may rotate as a result. A plurality of guide projections 18 along the circumference of the housing inside section 16 in the introduction space 17 may extend upward from the lowermost end or surface of the housing inside section 16.

Since the guide projections 18, which project inward from the surface of the housing inside section 16, are each inclined and/or curved in the same direction, the hot air 70 passing through the housing inside section 16 is guided by the guide projections 18 and forms a vortex flow.

As the hot air 70 forming the vortex flow moves to the support unit 30 through the housing body 10, the time and area by and over which the cooking object(s) 60 on the support unit 30 and the hot air 70 come into contact with each other increase, and the cooking time may be reduced or shortened.

Referring to FIGS. 13 to 16, the support unit 30 on the housing unit 5 may have any of a variety of shapes without departing from the technical concept that it includes a plurality of through-holes and supports the cooking object(s) 60 to be cooked by the hot air 70.

The support unit 30 in accordance with various embodiment(s) includes a support body section 31 and a cover section 39. The support body section 31 may have any of a variety of shapes without departing from the technical concept that it includes the plurality of through-holes through which the hot air 70 flows, and the cover section 39 may have any of a variety of shapes without departing from the technical concept that it covers the outer periphery of the support body section 31.

The support body section 31 in accordance with various embodiment(s) includes a peripheral support part 32, a central support part 33, a plurality of first support parts 34, and a plurality of second support parts 36.

The peripheral support part 32 may have an annular shape. The cover section 39 covers the peripheral support part 32. The central support part 33, the first support parts 34 and the second support parts 36 are generally inside the peripheral support part 32.

The peripheral support part 32 covered by the cover section 39 may have a ring or annular shape, and may comprise or consist essentially of aluminum.

The central support part 33 is at the center portion of the support body section 31, inside the peripheral support part 32. The central support part 33 and the peripheral support part 32 are separate from each other.

The first support parts 34 and the second support parts 36 which extend from the central support part 33 are connected to the peripheral support part 32. Since the first support parts 34 and the second support parts 36 may be curved and/or have a spiral shape, they may guide the rotation of the hot air 70 which flows from the lowermost end or surface of the support unit 30 toward the uppermost end or surface of the support unit 30.

The first support parts 34 have first through-holes 35 through which the hot air 70 passes. The first support parts 34 extend from the central support part 33 to the peripheral support part 32, and may have a curved or spiral shape. The first through-holes 35 may have an oval or curved oval (e.g., "kidney") shape. A plurality of first support parts 34 are along the circumference of the central support part 33, and the second support parts 36 are between adjacent first support parts 34.

The second support parts 36 have second through-holes 37 through which the hot air 70 passes, and extend like the first support parts 34. The second support parts 36 may have a curved or spiral shape. The second through-holes 37 may have an oval or curved oval (e.g., "kidney") shape. The second support parts 36 may have a width that is at least two times the width of the first support parts 34. Cooking the cooking object(s) 60 is mainly carried out by and/or on the second support parts 36.

Since the uppermost surface of the second support parts 36 is below the first support parts 34, the hot air 70 moving from the lowermost end or surface of the support unit 30 toward the uppermost end or surface of the support unit 30 rotates along the lower surfaces of the first support parts 34 and forms a vortex flow.

Because the direction of the vortex flow formed as the hot air 70 passes the guide projections 18 of the housing unit 5 is the same as the vortex flow formed as the hot air 70 moves along the lower surfaces of the first support parts 34, the hot air 70 forms a vortex flow inside the housing unit 5, and the contact time of the hot air 70 with the cooking object(s) 60 increases.

The first through-holes 35 in the first support parts 34 and the second through-holes 37 in the second support parts 36 extend in a circumferential direction. The first through-holes 35 and the second through-holes 37 may form arcs centered on the central support part 33. A plurality of first through-holes 35 and a plurality of second through-holes 37 are between the central support part 33 and the peripheral support part 32.

The second support parts 36 include rounded support portions 38 having an arc-like shape and a convex upward cross-section, although the second support parts 36 are not limited to such a configuration. The arc(s) of the second support parts 36 are generally centered on the central support part 33.

The rounded support portions 38 may have an upwardly convex shape, and the lowermost surface of the rounded support portions 38 may be concave. Thus, juice or other liquid(s) coming out from the cooking object(s) 60 on the rounded support portions 38 flows downward on the rounded support portions 38 and optionally into the body 10. As a result, cleaning the surface(s) of the second support parts 36 may be relatively easy or convenient to perform.

Further, since the hot air 70 supplied to the lower portions of the rounded support portions 38 may stay in the concave grooves of the rounded support portions 38, the contact time of the hot air 70 with the rounded support portions 38 increases, and heating the rounded support portions 38 may be easily implemented, whereby the cooking time for the cooking object(s) 60 may be reduced or shortened.

The cover section 39 covering the peripheral support part 32 may comprise rubber and/or silicon. Thus, it is possible to prevent sparks from occurring at the periphery of the support unit 30 while the support unit 30 is placed in a microwave oven.

The support unit 30 in accordance with one or more embodiment(s) may comprise aluminum coated with Teflon or other low-stick or non-stick material. Since aluminum has high heat conductivity, heating the cooking object(s) 60 may be quickly implemented, and the coating may prevent adhesion of the cooking object(s) 60 to the support unit 30.

Since the cover section 39 may include silicone, it is generally between the support unit 30 (which may comprise aluminum) and the housing body 10 (which may comprise a steel plate), and can prevent the occurrence of a spark.

Referring to FIGS. 13 to 17, each of the leg sections 40 includes a leg frame 42 fixed to the outer surface of the housing unit 5, and a leg cover 45 which surrounds and receives the leg frame 42. The leg frame 42 may comprise a shaped wire.

The leg frame 42 may comprise a steel structure, and the leg cover 45 surrounding and receiving the leg frame 42 may comprise silicone.

The leg frame 42 in accordance with one or more embodiment(s) includes a fixing part 43 fixed to the lower portion of the housing unit 5, and extending parts 44 which extend downward from ends of the fixing part 43.

Since the leg cover 45 is coupled to the extending parts 44 which outwardly slope and extend downward from the lower portion of the housing unit 5, the leg cover 45 is fixed to the outer surfaces of the extending parts 44.

The leg cover 45 in accordance with one or more embodiment(s) of the present disclosure includes a cover body 46 which has mounting grooves or holes 47 into which the extending parts 44 are inserted, and a shielding part 48 comprising a groove in the cover body 46 configured to shield the fixing part 43.

The mounting grooves or holes 47 extend into the cover body 46, and the shielding part 48 which may at least partially conform to the contour of the fixing part 43 is in one end of the cover body 46.

Because the extending parts 44 are inserted into the mounting grooves or holes 47, and the fixing part 43 is received in the shielding part 48, the leg frame 42 is shielded by the leg cover 45, by which the occurrence of a spark may be prevented.

Referring to FIGS. 12 and 18, the cooking container 1 is rotated by the rotation plate 270 of the cooking apparatus. Thus, it is possible to uniformly heat the cooking object(s) 60.

The cooking container 1 is placed on the rotation plate 270 of the cooking apparatus. The hot air 70 produced from the convection heater unit 300 moves or flows to the lower end or underside of the cooking container 1 and enters the inside of the housing unit 5 from underneath.

Hereinafter, operations of the cooking container 1 for a cooking apparatus in accordance with one or more embodiment(s) of the present disclosure will be described in detail.

After placing the cooking container 1 in the cooking apparatus, the upper heater unit 700 and the convection heater unit 300 are operated. The heat from the upper heater unit 700 is transferred downward toward the support unit 30. The heat below the support unit 30 may be reflected inside the housing body 10 and may move upwards. Since the heat reflected by the housing body 10 is transferred to the lowermost end or surface of the support unit 30 and may provide secondary heat to the cooking object(s) 60, the cooking time may be reduced or shortened.

Hereinafter, operations of the cooking container 1 for a cooking apparatus in accordance with one or more embodiment(s) of the present disclosure will be described in detail.

After placing the cooking container 1 in the cooking chamber C of the cooking apparatus, the convection heater unit 300 is operated. The hot air 70 from the convection heater unit 300 moves or flows laterally or horizontally, in the direction of the housing body 10, to the lower end or underside of the housing body 10.

The hot air 70 guided to the lower end or underside of the housing body 10 on the housing side section 12 flows to the introduction space 17 in the housing inside section 16. The hot air 70 moves upward through the housing inside section 16 and rotates and/or is guided by the guide projections 18 in the housing inside section 16, and may create a vortex flow.

Since the hot air 70 entering the housing body 10 creates the vortex flow while rotating on and/or contacting the lower surfaces of the first support parts 34 in the support unit 30, the contact time of the support body section 31 and the cooking object(s) 60 with the hot air 70 increases, whereby thermal efficiency may improve and the cooking time of the cooking object(s) 60 may be reduced or shortened.

Furthermore, as the hot air 70 moving upward from the lowermost end or surface of the support unit 30 toward the uppermost end or surface of the support unit 30 may stay in the concave grooves of the rounded support portions 38 in the second support parts 36, the contact time of the hot air 70 and the support body section 31 may increase, by which heating of the support body section 31 may be easily implemented.

Hereafter, a cooking container for a cooking apparatus in accordance with another embodiment of the present disclosure will be described with reference to drawings. For the sake of convenience in explanations, the same reference numerals will be used to refer to components and/or elements with the same constructions and functions as other embodiment(s) of the present disclosure, and detailed descriptions thereof will be omitted.

Figure 21:
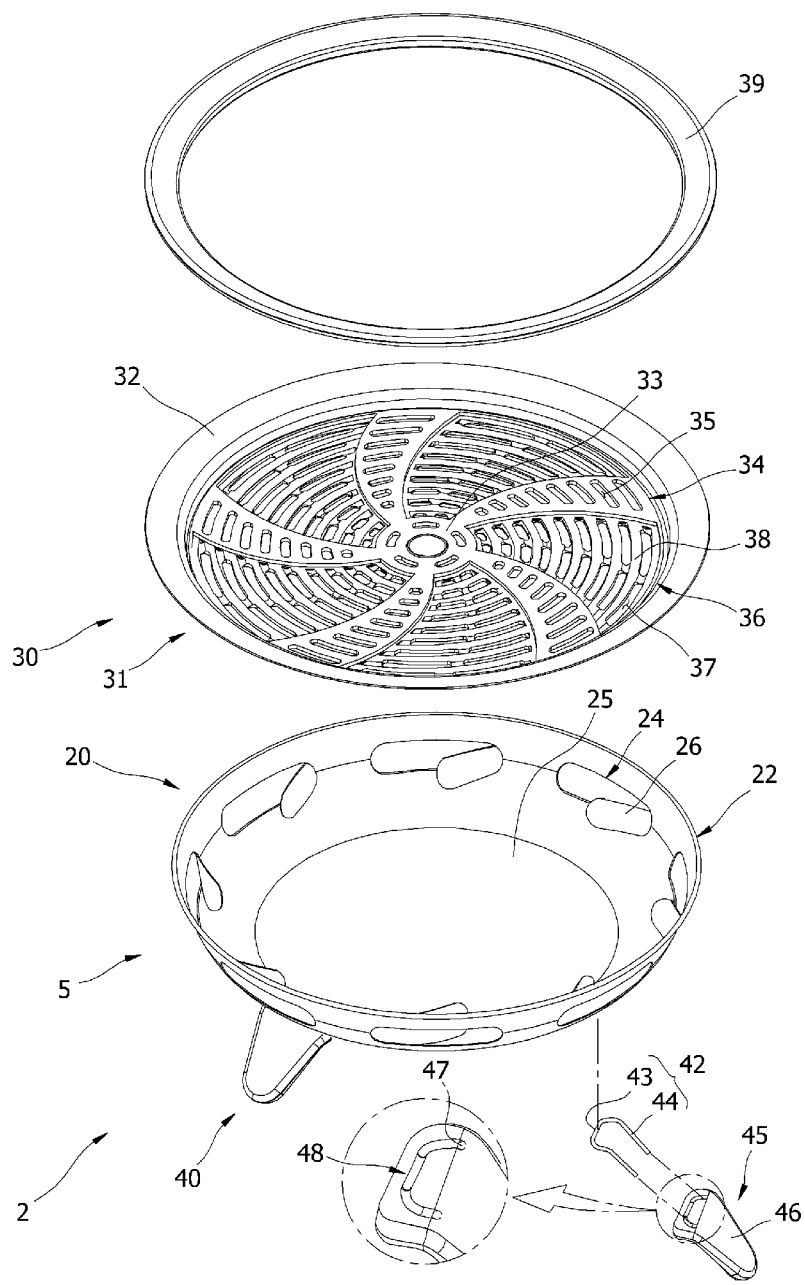
FIG. 21 is an exploded perspective view of an exemplary cooking container for a cooking apparatus in accordance with one or more embodiments of the present disclosure.
Figure 22:
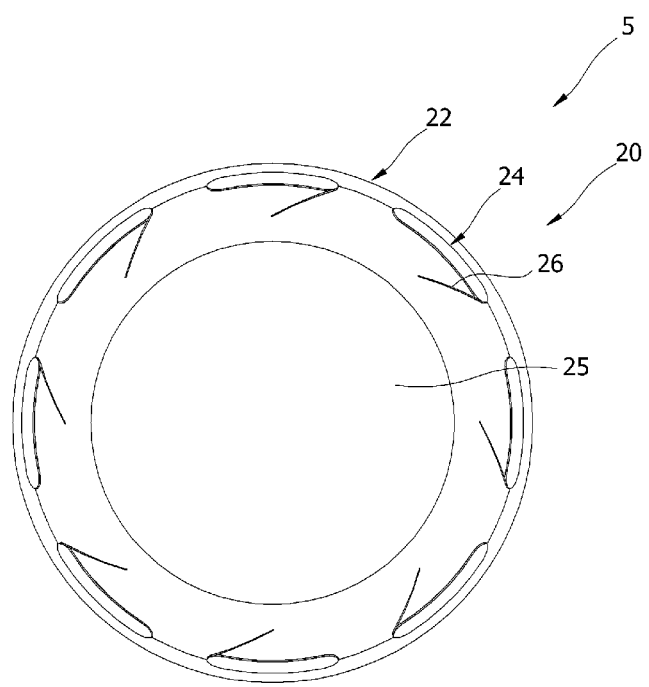
FIG. 22 is a plan view illustrating a housing body in the exemplary cooking container for a cooking apparatus in accordance with embodiment(s) of the present disclosure.
Figure 23:
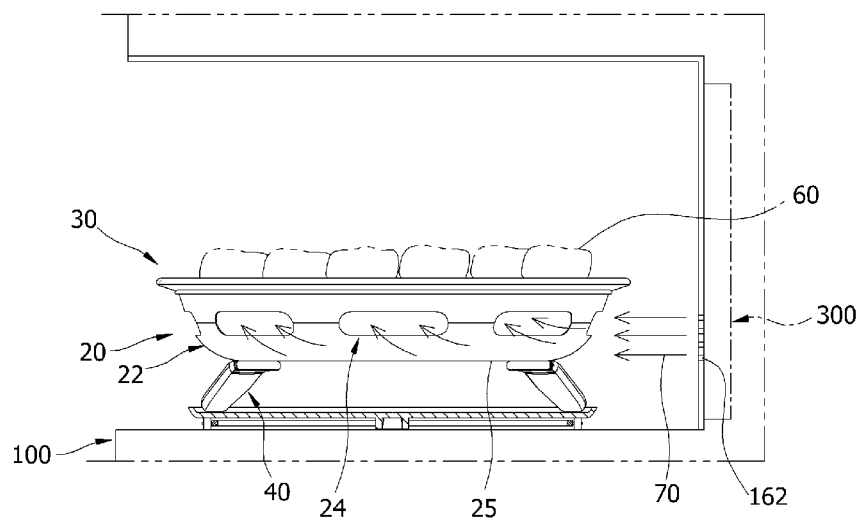
FIG. 23 is a view illustrating an exemplary cooking container in accordance with one or more embodiments of the present disclosure used for frying in a cooking apparatus.

FIG. 21 is an exploded perspective view of an exemplary cooking container for a cooking apparatus in accordance with one or more embodiments of the present disclosure, FIG. 22 is a plan view illustrating a housing body for the exemplary cooking container in accordance with embodiment(s) of the present disclosure, and FIG. 23 is a view illustrating the exemplary cooking container in accordance with embodiment(s) of the present disclosure in a cooking apparatus in frying mode.

Referring to FIGS. 21 to 23, the housing unit 5 in accordance with one or more other embodiments of the present disclosure includes a housing body 20 and leg sections 40.

Entrances 24 configured to supply hot air 70 to the inside of the housing body 20 are along the side surface of the housing body 20. The uppermost end or surface of the housing body 20 is open, and the lower end or underside of the housing body 20 is supported by the leg sections 40.

The housing body 20 in accordance with one or more embodiment(s) of the present disclosure includes a housing side section 22, a housing bottom section 25, and inner guides 26.

The housing side section 22 forms an outside surface of the housing body 20 and supports the periphery of the support unit 30. The housing side section 22 may have a ring or annular shape which extends downward.

The entrances 24 along the circumference of the housing side section 22 form passages through which the hot air 70 moves to the inside of the housing body 20. The entrances 24 may comprise slots or openings which extend horizontally. A plurality of entrances 24 are along the housing side section 22.

The housing bottom section 25 is secured to or integral with the lowermost end or surface of the housing side section 22 forms the bottom of the housing body 20.

Since the upper ends or uppermost boundaries of the entrances 24 have the same height as or a lower height than the height of the upper end of the lower introduction hole section 162 from which the hot air 70 is discharged towards the side of the housing body 20, the hot air 70 may easily enter the entrances 24.

A portion of the hot air 70 from the lower introduction hole section 162 moves to the inside of the housing body 20 through the entrances 24 in the side surface of the housing side section 22, and the hot air 70 above the entrances 24 flows downwardly along the curved or sloped surface of the housing side section 22 and enters the entrances 24. As a consequence, the heating time of the cooking object(s) 60 by the hot air 70 may be reduced or shortened.

The inner guides 26 are connected to the inner surface of the housing side section 22, and project into the housing side section 22. The inner guides 26 may have any of a variety of shapes without departing from the technical concept that they guide the movement of the hot air 70 that enters the entrances 24.

The inner guides 26 in accordance with one or more embodiment(s) of the present disclosure project toward the inside of the housing side section 22 from one end of the entrance 24 in a horizontal direction and/or at an angle facilitating formation of a vortex flow of the hot air 70 inside the housing body 20.

The hot air 70 entering the entrances 24 is guided by the inner guides 26 and forms a vortex flow. As a result, the contact area and contact time of the hot air 70 and the cooking object(s) 60 with each other increase.

Hereinafter, operations of the exemplary cooking container 2 for a cooking apparatus in accordance with one or more embodiment(s) of the present disclosure will be described in detail.

The hot air 70 produced from the convection heater unit 300 moves toward the side of the housing body 20, and some of the hot air 70 at the housing side section 22 moves to the inside of the housing body 20 through the entrances 24. The hot air 70 in the housing body 20 rotates inside the housing body 20, and its movement is guided by the inner guides 26.

Since the hot air 70 creates a vortex that flows inside of the housing body 20 and rotates on the surfaces of the first support parts 34 in the support unit 30, the contact time of the support body section 31 and the cooking object(s) 60 with the hot air 70 increases, whereby thermal efficiency may be improved and the cooking time of the cooking object(s) 60 may be reduced or shortened.

Furthermore, as the hot air 70 moving upward from the lowermost end or surface of the support unit 30 toward the uppermost end or surface of the support unit 30 stays for at least some time in the concave grooves of the rounded support portions 38 in the second support parts 36, the contact time of the hot air 70 with the support body section 31 increases, by which heating of the support body section 31 may be easily implemented.

By the above-described constructions, since the cooking containers 1 and 2 in accordance with various embodiments carry out frying by heating the cooking object(s) 60 on the support unit 30 with the hot air 70, it is possible to decrease the likelihood of a safety-related accident to occur due to use of oil, improve the nutritional and/or health benefits of the cooked food, and reduce the cooking cost.

Also, since the hot air 70 entering the inside of the housing unit 5 heats the cooking object(s) 60 while rotating in a spiral pattern, the contact time of the hot air 70 with the cooking object(s) 60 increases, whereby it is possible to shorten or reduce the cooking time.

Further, since the rounded support portions 38 which support the cooking object(s) 60 have a convex upward shape, the contact area between the cooking object(s) 60 and the support unit 30 is decreased, and a contact area over which the hot air 70 and the cooking object(s) 60 come into contact with each other is increased, whereby it is possible to shorten or reduce the cooking time.

Hereinafter, a cooking container for a cooking apparatus in accordance with one or more further embodiments of the present disclosure will be described with reference to drawings. For the sake of convenience in explanations, the same reference numerals will be used to refer to component elements with the same constructions and functions as other embodiment(s) of the present disclosure, and detailed descriptions thereof will be omitted.

Figure 24:
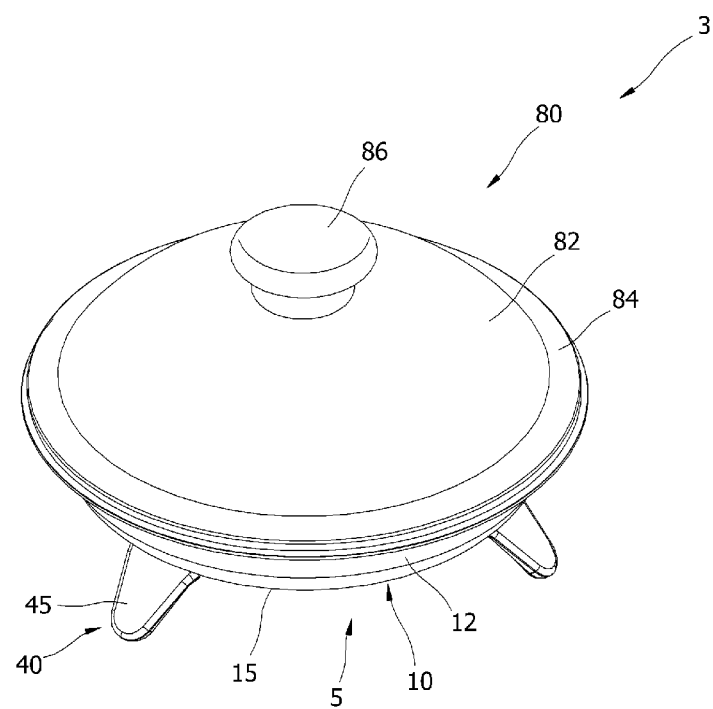
FIG. 24 is a perspective view of an exemplary cooking container for a cooking apparatus in accordance with one or more embodiments of the present disclosure.
Figure 25:
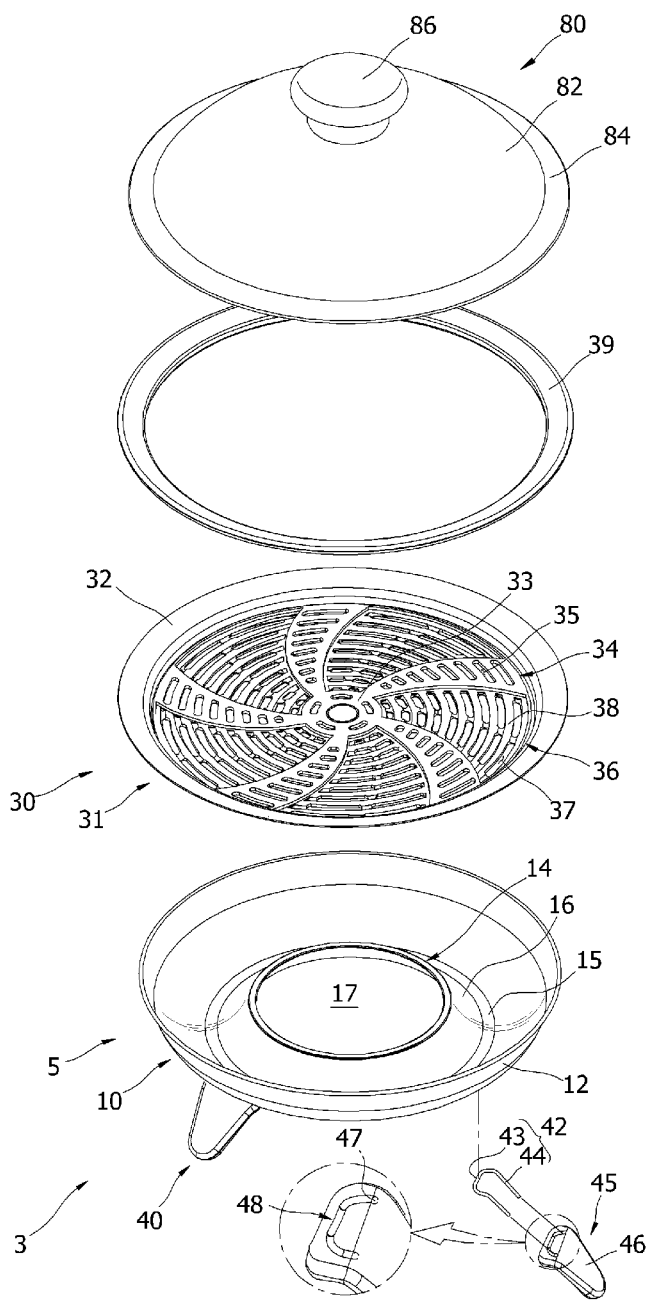
FIG. 25 is an exploded perspective view of the cooking container for a cooking apparatus in accordance with embodiment(s) of the present disclosure.
Figure 26:
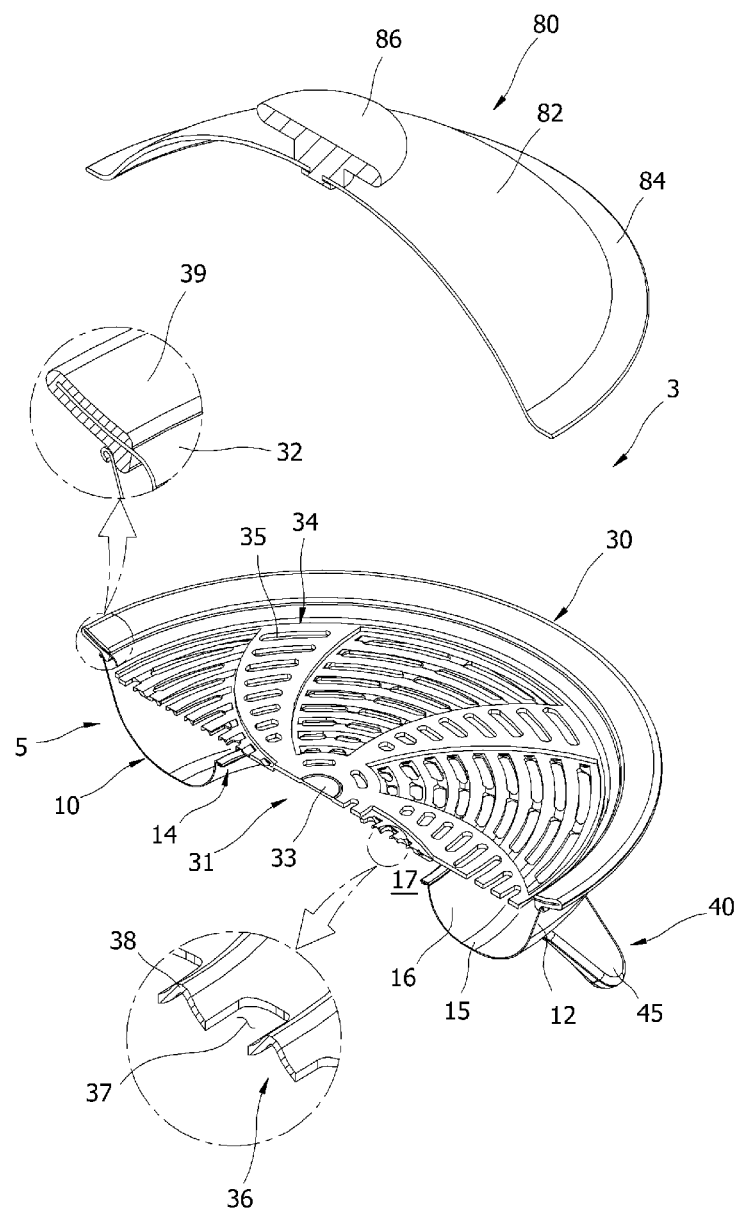
FIG. 26 is a cut-away perspective view of the cooking container for a cooking apparatus in accordance with embodiment(s) of the present disclosure.
Figure 27:
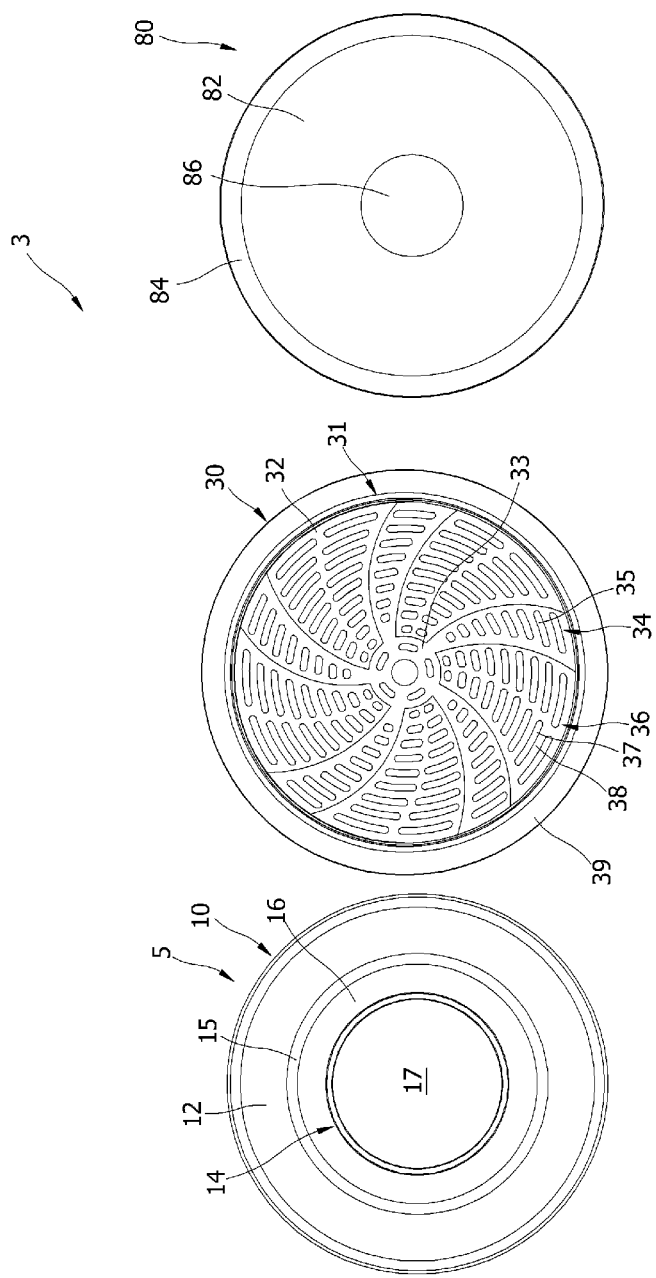
FIG. 27 is a plan view illustrating an exploded cooking container for a cooking apparatus in accordance with embodiment(s) of the present disclosure.
Figure 28:
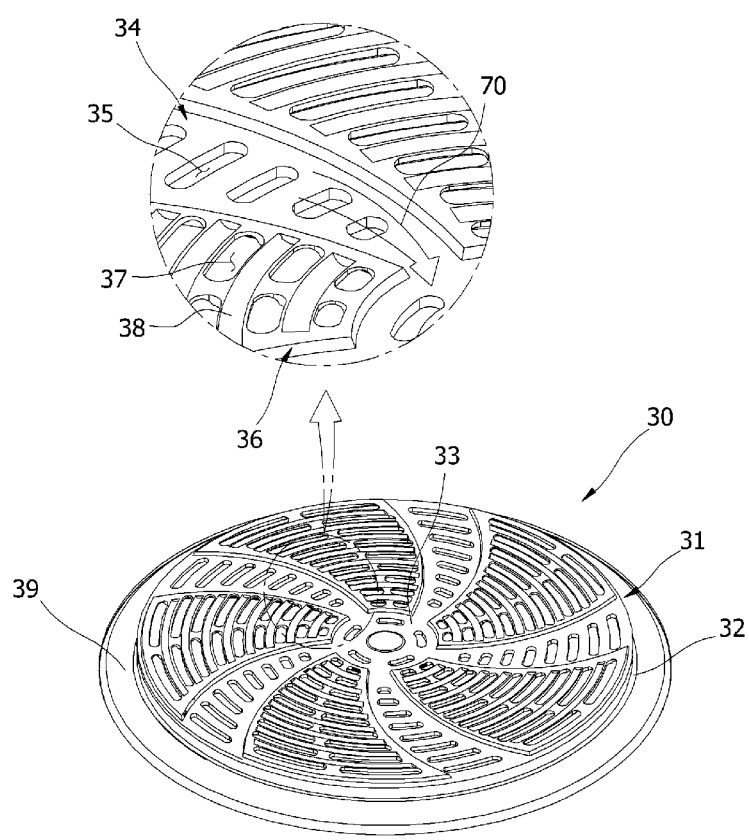
FIG. 28 is a perspective view illustrating the rear surface of a support unit in the exemplary cooking container for a cooking apparatus in accordance with embodiment(s) of the present disclosure.
Figure 29:
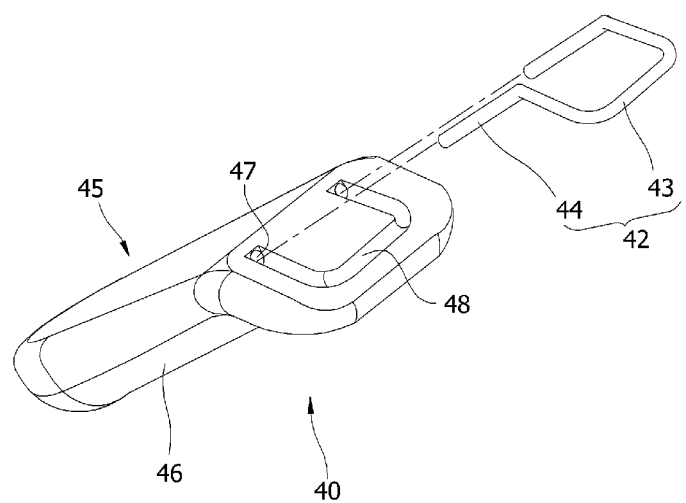
FIG. 29 is an exploded perspective view illustrating an exemplary leg for the cooking container in accordance with embodiment(s) of the present disclosure.
Figure 30:
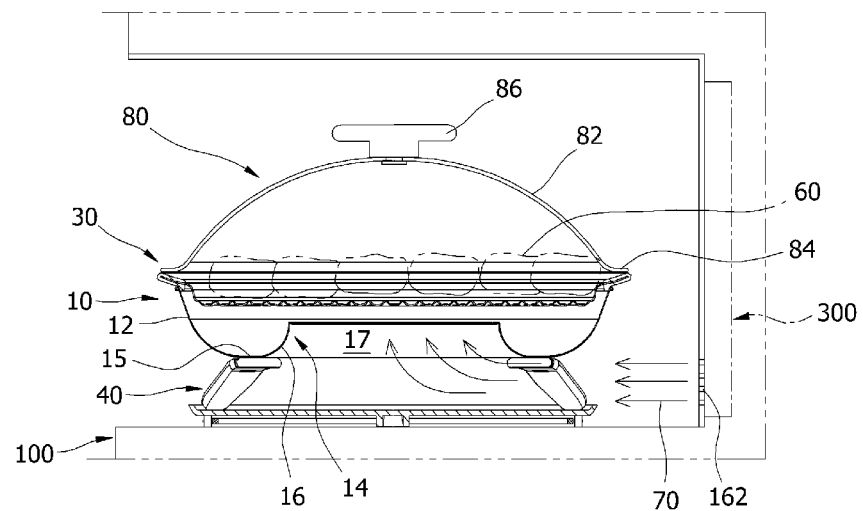
FIG. 30 is a view illustrating the exemplary cooking container in accordance with embodiment(s) of the present disclosure in a cooking apparatus during frying.
Figure 31:
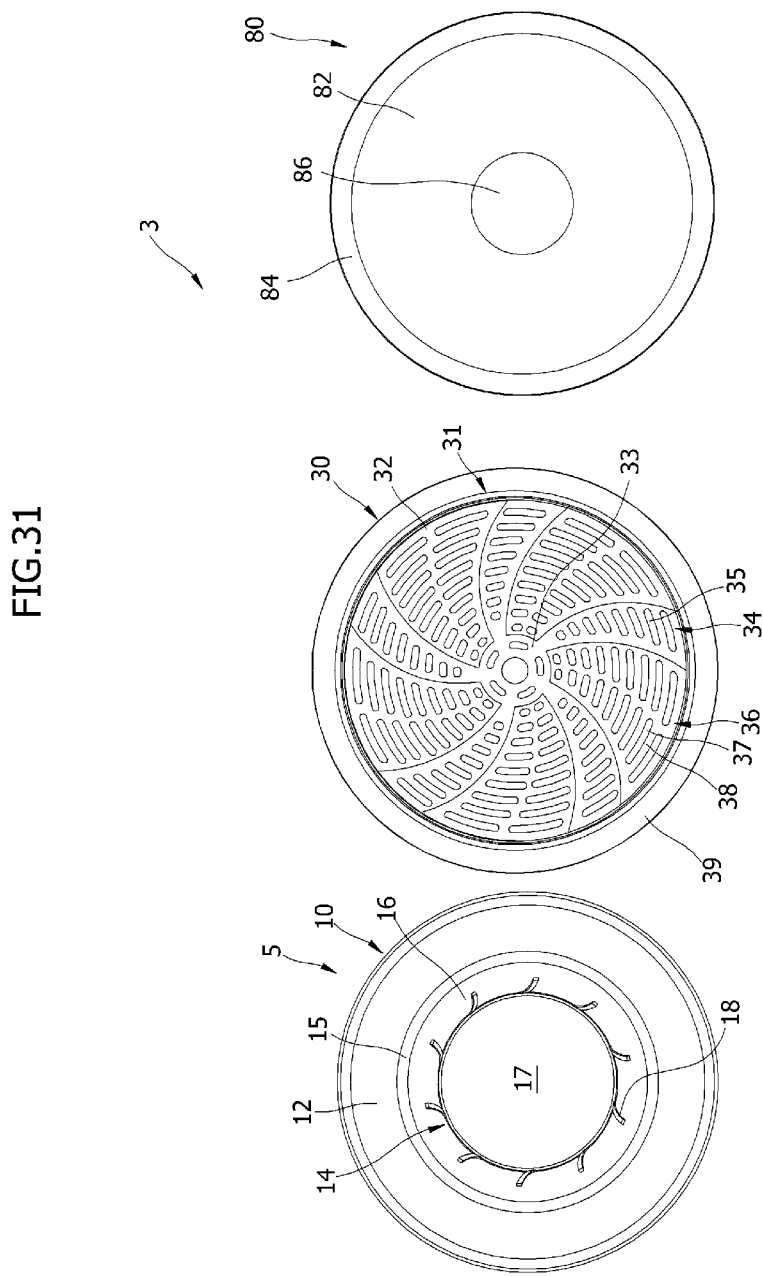
FIG. 31 is a plan view illustrating a variation of a housing body in the exemplary cooking container for a cooking apparatus in accordance with embodiment(s) of the present disclosure.
Figure 32:
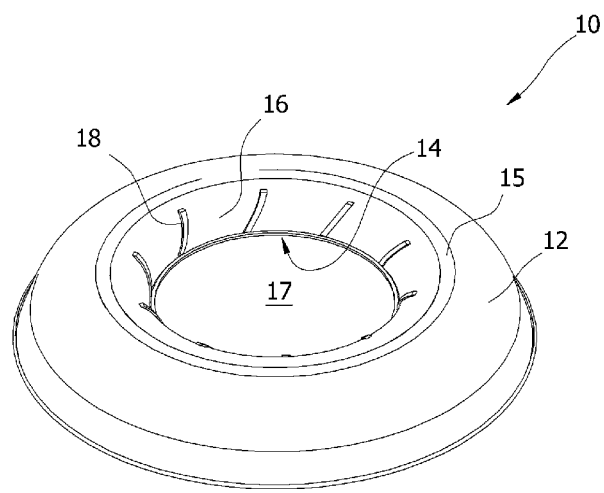
FIG. 32 is a perspective view illustrating the variation of the housing body of FIG. 35 in the exemplary cooking container for a cooking apparatus in accordance with embodiment(s) of the present disclosure.

FIG. 24 is a perspective view of an exemplary cooking container for a cooking apparatus in accordance with one or more embodiments of the present disclosure, FIG. 25 is an exploded perspective view of the exemplary cooking container in accordance with embodiment(s) of the present disclosure, and FIG. 26 is a broken-away perspective view of the exemplary cooking container in accordance with embodiment(s) of the present disclosure. FIG. 27 is a plan view illustrating an exploded cooking container for an exemplary cooking apparatus in accordance with embodiment(s) of the present disclosure, FIG. 28 is a perspective view illustrating the rear surface of a support unit in the exemplary cooking container in accordance with embodiment(s) of the present disclosure, and FIG. 29 is an exploded perspective view illustrating a leg section in the exemplary cooking container for a cooking apparatus in accordance with embodiment(s) of the present disclosure. FIG. 30 is a view illustrating the exemplary cooking container in accordance with embodiment(s) of the present disclosure in a cooking apparatus in frying mode. FIG. 31 is a plan view illustrating a variation of a housing body in the exemplary cooking container for a cooking apparatus in accordance with embodiment(s) of the present disclosure, and FIG. 32 is a perspective view illustrating the variation of the housing body in the exemplary cooking container in accordance with embodiment(s) of the present disclosure.

Referring to FIGS. 24, 25 and 30, an exemplary cooking container 3 for a cooking apparatus in accordance with a third embodiment of the present disclosure includes a housing unit 5 which has an entrance 14 through which hot air 70 enters, a support unit 30 on the housing unit 5 and on which cooking object(s) 60 to be cooked by the hot air 70 are placed, and a cover unit 80 which covers the support unit 30 and restricts or restrains the movement of the hot air 70. Namely, the exemplary cooking container 3 in accordance with embodiment(s) of the present disclosure further includes the cover unit 80 in addition to the exemplary cooking container 1 in accordance with other embodiment(s).

The cover unit 80 includes a cover body section 82 which closes the uppermost end or surface of the support unit 30, and a knob member 86 which projects upward from the cover body section 82.

The cover body section 82 may have a dome-like or spherical cap shape. The cover body section 82 covers the support unit 30, and may restrict or restrain the movement of the hot air 70 that might otherwise move outside of the cooking container 3. Also, since the cover body section 82 defines therein a space in which the hot air 70 may stay, the heating time for cooking the cooking object(s) 60 may be reduced or shortened.

A junction member 84 configured to be brought into contact with the periphery of the support unit 30 and that may comprise an elastic material is on the periphery of the cover body section 82. The junction member 84 facilitates effective restriction and/or restraint of the movement of the hot air 70 within the cover body section 82.

The junction member 84 may have an annular or ring shape that projects outward from the periphery of the cover body 82. The lower surface of the junction member 84 comes into contact with the cover section 39 of the support unit 30, and may improve airtightness.

Referring to FIGS. 24 to 30, the cover unit 80 may have any of a variety of shapes without departing from the technical concept that it restricts or restrains the movement of the hot air 70 which might otherwise move upwardly from the support unit 30.

Hereinafter, operations of the exemplary cooking container 3 for a cooking apparatus in accordance with embodiment(s) of the present disclosure will be described in detail.

After placing the cooking container 3 in the cooking apparatus, the convection heater unit 300 is operated. The hot air 70 produced from the convection heater unit 300 moves toward the side of the housing body 10 or to the lower end or underside of the housing body 10. The hot air 70 at the lower end or underside of the housing body 10 on the housing side section 12 flows to the introduction space 17 defined by the housing inside section 16. The hot air 70 moves upward through the housing inside section 16, and at least some part is rotated by the guide projections 18 on the housing inside section 16 to create a vortex flow.

Since the hot air 70 entering the inside of the housing body 10 creates a vortex flow while rotating on the lower surfaces of the first support parts 34 in the support unit 30, the contact time of the support body section 31 and the cooking object(s) 60 with the hot air 70 is increased, whereby thermal efficiency may be improved and the cooking time of the cooking object(s) 60 may be reduced or shortened.

Furthermore, as the hot air 70 moving upward from the lowermost end or surface of the support unit 30 toward the uppermost end or surface of the support unit 30 may stay in the concave grooves of the rounded support portions 38 in the second support parts 36, the contact time of the hot air 70 with the support body section 31 is increased, by which heating of the support body section 31 may be easily implemented.

Meanwhile, the hot air 70 moving up from the support unit 30 after heating the cooking object(s) 60 is reflected on the inner surface of the cover unit 80, then moves back down toward the support unit 30, and secondarily heats the cooking object(s) 60, whereby the cooking time may be reduced or shortened.

Since the hot air 70 having moved upward after heating the cooking object(s) 60 stays inside the cover unit 80 and raises the temperature inside of the cover unit 80, the cooking time of the cooking object(s) 60 below the cover unit 80 may be reduced or shortened.

Hereafter, an exemplary cooking container for a cooking apparatus in accordance with one or more further embodiments of the present disclosure will be described with reference to drawings. For the sake of convenience in explanations, the same reference numerals will be used to refer to component elements with the same constructions and functions as other embodiment(s) of the present disclosure, and detailed descriptions thereof will be omitted.

Figure 33:
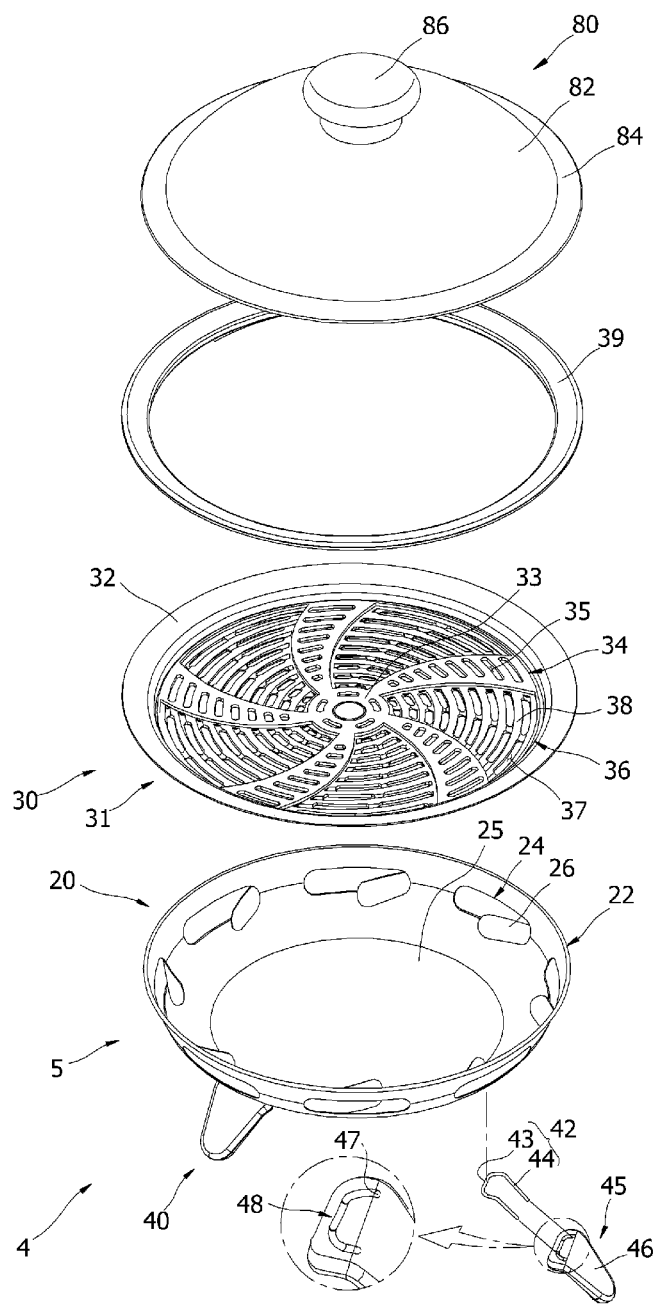
FIG. 33 is an exploded perspective view of a cooking container for a cooking apparatus in accordance with one or more embodiments of the present disclosure.
Figure 34:
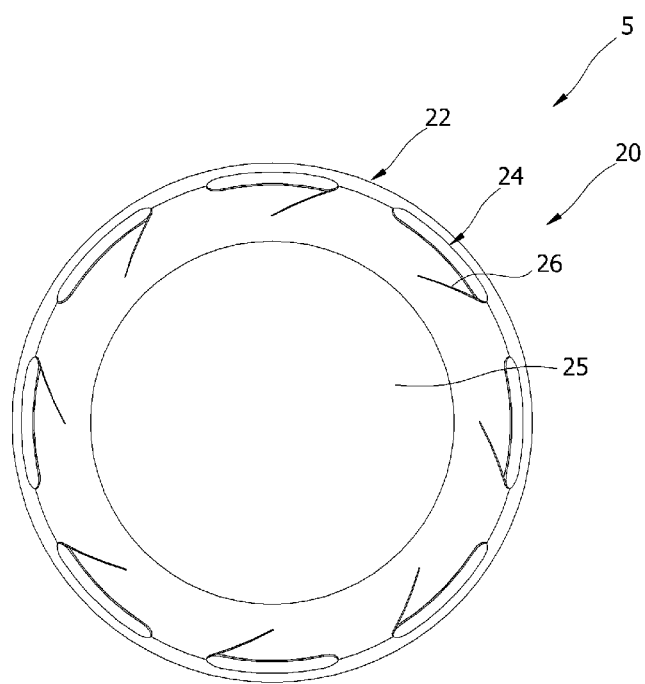
FIG. 34 is a plan view illustrating a housing body in the cooking container for a cooking apparatus in accordance with embodiment(s) of the present disclosure.
Figure 35:
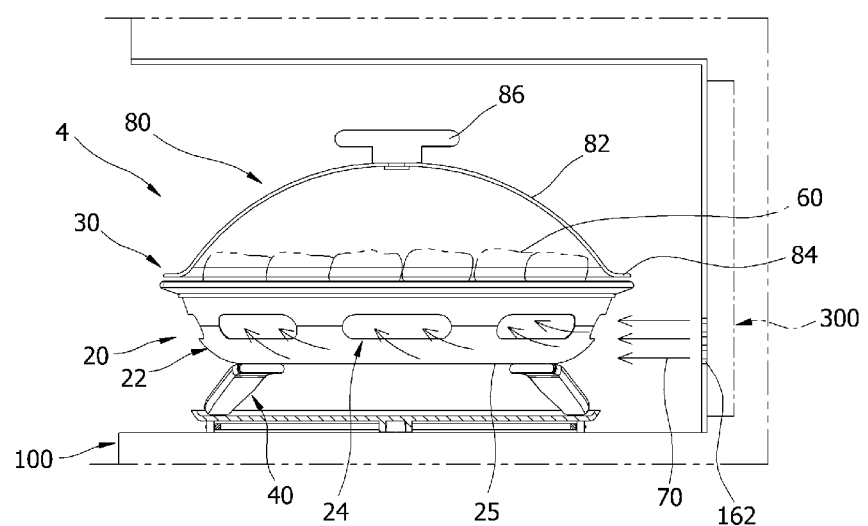
FIG. 35 is a view illustrating the exemplary cooking container in accordance with embodiment(s) of the present disclosure in a cooking apparatus during frying.

FIG. 33 is an exploded perspective view of an exemplary cooking container for a cooking apparatus in accordance with embodiment(s) of the present disclosure, FIG. 34 is a plan view illustrating a housing body in the exemplary cooking container in accordance with embodiment(s) of the present disclosure, and FIG. 35 is a view illustrating the exemplary cooking container in accordance with embodiment(s) of the present disclosure in a cooking apparatus in frying mode.

Referring to FIGS. 33 to 35, an exemplary cooking container 4 for a cooking apparatus in accordance with embodiment(s) of the present disclosure further includes a cover unit 80 in addition to the exemplary cooking container 2 in accordance with other embodiment(s). The housing unit 5 of the cooking container 4 includes a housing body 20 and leg sections 40.

Entrances 24 configured to supply hot air 70 to the inside of the housing body 20 are along the side surface of the housing body 20. The uppermost end or surface of the housing body 20 is open, and the lower end or underside of the housing body 20 is supported by the leg sections 40.

The housing body 20 in accordance with embodiment(s) of the present disclosure includes a housing side section 22, a housing bottom section 25, and inner guides 26.

The housing side section 22 which forms the side surface of the housing body 20 supports the periphery of the support unit 30, and has a ring or annular shape which extends downward.

The entrances 24 along the circumference of the housing side section 22 form passages through which the hot air 70 moves to the inside of the housing body 20. The entrances 24 comprise or constitute slots or ovals that may extend horizontally. A plurality of entrances 24 are along the housing side section 22.

The housing bottom section 25 is horizontally secured to the lowermost end or surface of the housing side section 22 and forms the bottom of the housing body 20.

The upper ends of the entrances 24 may have a height the same as or lower than the height of the upper end of the lower introduction hole section 162 from which the hot air 70 is discharged towards the side of the housing body 20. As a result, the hot air 70 may easily enter the entrances 24.

The inner guides 26 are connected to the inner surface of the housing side section 22 and project into the housing side section 22. The inner guides 26 may have any of a variety of shapes without departing from the technical concept that they guide the movement of the hot air 70 that enters into the housing body 20 through the entrances 24.

The inner guides 26 in accordance with embodiment(s) of the present disclosure incline and/or project into the housing side section 22 from an end of a corresponding entrance 24. For example, the inner guides 26 may have a horizontal angle with respect to the housing side section 22.

The hot air 70 that enters into the entrances 24 is guided by the inner guides 26 and forms a vortex flow. As a result, the contact area and/or contact time of the hot air 70 with the cooking object(s) 60 may increase.

Hereinafter, operations of the exemplary cooking container 4 for a cooking apparatus in accordance with embodiment(s) of the present disclosure will be described in detail.

The hot air 70 produced by the convection heater unit 300 moves towards the side of the housing body 20, and the hot air 70 contacting the rounded surface of the housing side section 22 may enter the housing body 20 through the entrances 24. The hot air 70 entering the housing body 20 through the entrances 24 rotates inside of the housing body 20, and its movement may be guided by the inner guides 26.

The hot air 70 creates a vortex flow inside of the housing body 20 may create another vortex flow while being rotated on or by the surfaces of the first support parts 34 in the support unit 30. As a result, the contact time of the support body section 31 and the cooking object(s) 60 with the hot air 70 may increase, thermal efficiency may improve, and the cooking time of the cooking object(s) 60 may decrease.

Furthermore, as the hot air 70 moving upward from the lowermost end or surface of the support unit 30 toward the uppermost end or surface of the support unit 30 stays (at least temporarily) in the concave grooves of the rounded support portions 38 in the second support parts 36, the contact time of the hot air 70 with the support body section 31 may increase, and heating of the support body section 31 may be easily implemented.

By the above-described constructions, since the cooking containers 3 and 4 in accordance with various embodiments carry out frying by heating the cooking object(s) 60 on the support unit 30 with the hot air 70, it is possible to decrease the likelihood of safety-related accidents due to use of oil, the nutritional and/or health benefits of the cooked food may increase, and the cooking cost may be reduced.

Also, since the hot air 70 entering the housing unit 5 heats the cooking object(s) 60 while rotating (at least partially or substantially) in a spiral pattern, the contact time of the hot air 70 with the cooking object(s) 60 may increase, and it may be possible to reduce the cooking time.

Further, the rounded support portions 38 which support the cooking object(s) 60 may have a convex upward shape. Thus, the contact area between the cooking object(s) 60 and the support unit 30 may decrease, the contact area between the hot air 70 and the cooking object(s) 60 may increase, and it may be possible to shorten the cooking time.

Moreover, since the residence time of the hot air 70 moving upward through the support unit 30 in the housing bodies 10 and 20 and/or inside the cover unit 80 may increase, the cooking time of the cooking object(s) 60 may be reduced or shortened, and the cooking cost may decrease.

Hereafter, an exemplary cooking apparatus in accordance with one or more embodiment(s) of the present disclosure will be described with reference to drawings. For the sake of convenience in explanations, the same reference numerals will be used to refer to component elements with the same constructions and functions as other embodiment(s) of the present disclosure, and detailed descriptions thereof will be omitted.

Figure 36:
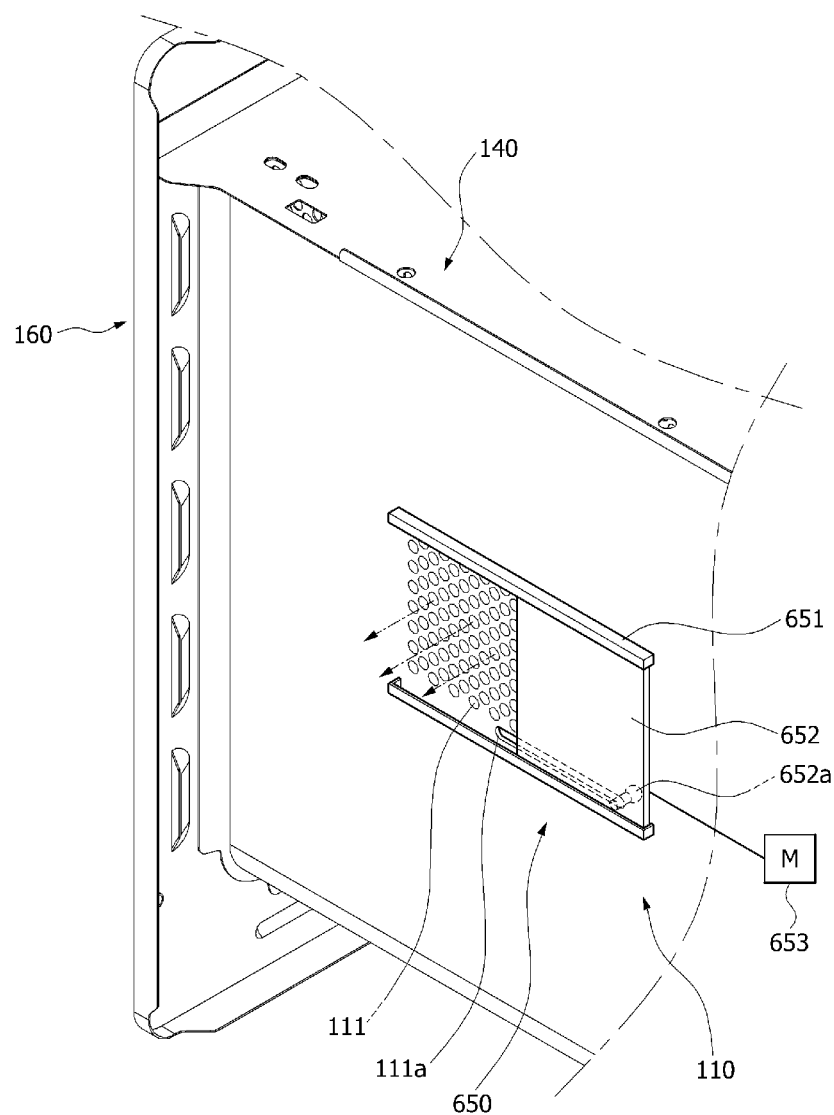
FIG. 36 is a perspective view illustrating an open discharge hole section in an exemplary cooking apparatus in accordance with one or more embodiments of the present disclosure.
Figure 37:
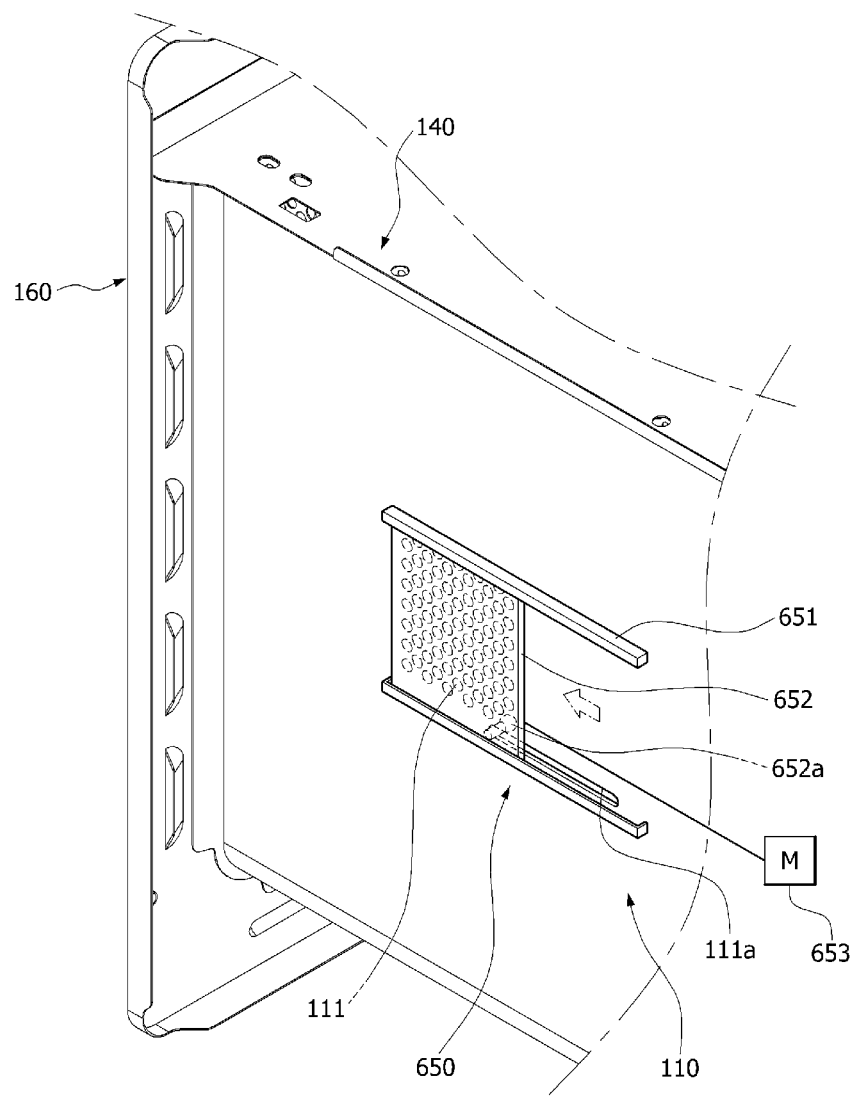
FIG. 37 is a perspective view illustrating a closed discharge hole section in the exemplary cooking apparatus in accordance with embodiment(s) of the present disclosure.
Figure 38:
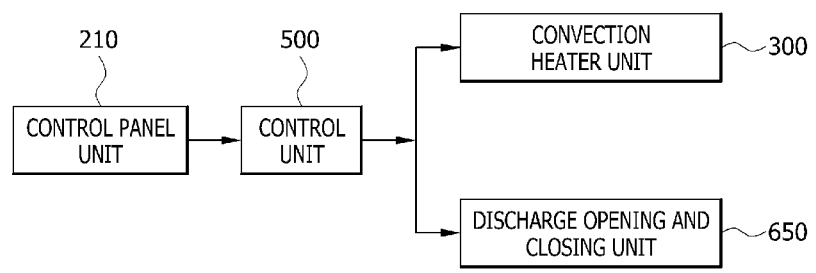
FIG. 38 is a block diagram schematically showing an exemplary control flow for the exemplary cooking apparatus in accordance with embodiment(s) of the present disclosure.

FIG. 36 is a perspective view illustrating an open discharge hole section in an exemplary cooking apparatus in accordance with one or more embodiments of the present disclosure, FIG. 37 is a perspective view illustrating a closed discharge hole section in the exemplary cooking apparatus in accordance with embodiment(s) of the present disclosure, and FIG. 38 is a block diagram schematically showing an exemplary control flow for the cooking apparatus in accordance with embodiment(s) of the present disclosure.

Referring to FIGS. 5, 6 and 36 to 38, a cooking apparatus in accordance with embodiment(s) of the present disclosure includes a cavity unit 100, a door unit 200, a cabinet unit 205, a convection heater unit 300, and a control unit 500, and may further include a discharge opening and closing unit 650, instead of a circulation duct unit.

The discharge opening and closing unit 650 opens and closes a discharge hole section 111. The discharge opening and closing unit 650 opens and closes the discharge hole section 111 according to the cooking mode.

In the general cooking mode, as the discharge opening and closing unit 650 opens the discharge hole section 111, air inside the cooking chamber C may be discharged outs of the cooking chamber C. As a result, in the general cooking mode, it is possible to prevent the temperature inside the cooking chamber C from rising excessively and/or the inside of the cooking chamber C from filling with steam or smoke.

In frying mode, the discharge opening and closing unit 650 closes the discharge hole section 111, and heat loss due to discharge of air in the cooking chamber C may be suppressed.

The discharge opening and closing unit 650 includes discharge rails 651 and a discharge opening and closing door 652. The discharge rails 651 are on the outer surface of a wall plate (e.g., the left wall plate 110). In one embodiment, a pair of discharge rails 651 are above and below the discharge hole section 111 and facing each other. The discharge opening and closing door 652 fits between the discharge rails 651, and the sliding movement of the discharge opening and closing door 652 may be guided and/or controlled by the pair of discharge rails 651.

The discharge rails 651 and the discharge opening and closing door 652 may comprise a heat-resistant material so that the discharge rails 651 and the discharge opening and closing door 652 do not degrade from the high temperature of the air inside the cooking chamber C.

A discharge opening and closing knob 652a may be on the discharge opening and closing door 652. In correspondence with the discharge opening and closing knob 652a, a discharge opening and closing slot 111a may be in the left wall plate 110.

The discharge opening and closing knob 652a is on the inner surface of the discharge opening and closing door 652 and projects toward the cooking chamber C by passing through the discharge opening and closing slot 111a. As the user moves the discharge opening and closing knob 652a which projects into the cooking chamber C through the left wall plate 110 left or right, the discharge opening and closing door 652 may slide and/or move leftward or rightward. The leftward and rightward movement of the discharge opening and closing knob 652a is guided and/or controlled by the discharge opening and closing slot 111a. Accordingly, the discharge opening and closing slot 111a may have a length corresponding to the movement length and/or distance of the discharge opening and closing knob 652a.

In this way, the discharge opening and closing knob 652a and the discharge opening and closing slot 111a are additionally provided enable the user to manually open or close the discharge hole section 111. Alternatively, the discharge opening and closing door 652 may be opened or closed automatically according to the cooking mode.

The discharge opening and closing unit 650 may further include a discharge opening and closing driving section 653. The discharge opening and closing driving section 653 is connected to the discharge opening and closing door 652 and slides or moves the discharge opening and closing door 652 left and right automatically. That is, the discharge opening and closing driving section 653 automatically opens or closes the discharge hole section 111 using the discharge opening and closing door 652 under the control of the control unit 500 when a cooking mode is selected using the control panel unit 210.

A driving device capable of automatically moving the discharge opening and closing door 652 left and right (or side to side, or horizontally) may comprise a motor and/or a mechanical cylinder.

According to embodiments of the present disclosure, it is possible to provide a cooking apparatus which can carry out not only general cooking but also frying.

According to embodiments of the present disclosure, since frying is carried out using the fat content in the cooking object(s), it is possible to prevent a safety-related accident due to high temperature oil, the nutritional and/or health benefits may increase, and the cooking cost may be reduced due to nonuse of oil.

According to embodiments of the present disclosure, defrosting and frying of a cooking object(s) may be simultaneously or sequentially carried out in one cooking apparatus, thereby improving user convenience.

According to embodiments of the present disclosure, frying and/or cooking may be carried out using both microwaves and hot air. As a result, the inside and the outside of the cooking object(s) may be evenly cooked when frying.

According to embodiments of the present disclosure, since the direction of hot air to be supplied in the cooking chamber may be adjusted and/or controlled using one or more introduction opening and closing units, cooking conditions may be optimized according to the cooking mode.

According to embodiments of the present disclosure, since hot air to be discharged out of the cooking chamber may be circulated back into the cooking chamber through a circulation duct unit, heat loss may be reduced or suppressed.

According to embodiments of the present disclosure, since it is possible to block hot air from being discharged outside of the cooking chamber using a duct opening and closing unit, heat loss may be reduced or suppressed.

According to embodiments of the present disclosure, the hot air entering the housing unit of a cooking container may heat the cooking object or objects while flowing in a spiral pattern. As a result, the contact time of the hot air with the cooking object(s) may increase, and it may be possible to shorten or reduce the cooking time and improve cooking performance.

According to embodiments of the present disclosure, rounded support portions configured to support the cooking object or objects may be convex facing upward, the contact area between the cooking object(s) and the support unit may decrease or be minimized, the contact area between the hot air and the cooking object(s) increases, the cooking time may decrease, and cooking performance may improve.

According to embodiments of the present disclosure, hot air discharged from heater units in the apparatus flowing onto a rounded side section of the housing of the cooking container may flow downward on the rounded surface and enter an entrance in the side section of the housing, which may reduce loss of hot air, and reduce or shorten the cooking time and/or improve cooking performance.

Embodiments of the present invention have been disclosed above for illustrative purposes. Those skilled in the art will appreciate that various modifications, additions and substitutions are possible, without departing from the scope and spirit of the invention as disclosed in the accompanying claims.

What is claimed is:

1. A convection cooking apparatus comprising:
a cavity unit having a cooking chamber and having a rear wall plate with an introduction hole section and a first discharge hole section;
a door unit on or over the cavity unit, configured to open and close an opening of the cavity unit;
a convection heater unit on or behind the rear wall plate, heating air from the cavity unit through the first discharge hole section, and supplying hot air to the cooking chamber through the introduction hole section; and
a circulation duct unit connected to a second discharge hole section in a side wall plate of the cavity unit, configured to guide air discharged from the cooking chamber through the first discharge hole section back to the cooking chamber,
wherein the introduction hole section is in a lower part of the rear wall plate, and the first discharge hole section is in an upper part of the rear wall plate separate from the introduction hole section,
wherein the circulation duct unit comprises:
a circulation duct having one end connected to the second discharge hole section and another end connected to a suction hole section in the side wall plate, configured to guide air discharged through the first discharge hole section to the suction hole section; and
a duct opening and closing section in the circulation duct, configured to open and close an internal flow path of the circulation duct,
wherein the circulation duct includes a discharge opening for discharging air entering through the first discharge hole section out of the circulation duct,
wherein the duct opening and closing section closes the first discharge opening when opening the internal flow path of the circulation duct, and opens the discharge opening when closing the internal flow path of the circulation duct.

2. The convection cooking apparatus according to claim 1, wherein the convection heater unit comprises:
a convection heater behind the rear wall plate, configured to generate heat;
a convection fan behind the rear wall plate, having a rotation shaft;
a convection motor configured to rotate the convection fan; and
a convection heater cover on the rear wall plate, covering the convection heater and the convection fan,
wherein the introduction hole section is below the rotation shaft of the convection fan, and the first discharge hole section is above the rotation shaft of the convection fan.

3. The convection cooking apparatus according to claim 2, wherein the convection heater unit further comprises:
a convection insulating cover covering the convection heater cover, in front of the convection motor; and
a convection cooling fan coupled to the convection motor.

4. The convection cooking apparatus according to claim 3, wherein the convection cooling fan rotates when the convection motor operates.

5. The convection cooking apparatus according to claim 1, wherein one of the first discharge hole section and the suction hole section is in an upper part of the side wall plate, and the other one of the first discharge hole section and the suction hole section is in a lower part of the side wall plate.

6. The convection cooking apparatus according to claim 1, wherein one of the first discharge hole section and the suction hole section is in a front part of the side wall plate, and the other one of the first discharge hole section and the suction hole section is in a rear part of the side wall plate.

7. A convection cooking apparatus comprising:
a cavity unit having a cooking chamber and a rear wall plate with an introduction hole section and a first discharge hole section;
a door on or over the cavity unit, configured to open and close an opening of the cavity unit;
a convection heater unit on the rear wall plate, heating air from the cavity unit through the first discharge hole section, and supplying hot air to the cooking chamber through the introduction hole section;
a circulation duct unit connected to a second discharge hole in a side wall plate of the cavity unit, configured to guide air discharged from the cooking chamber through the first discharge hole section back to the cooking chamber,
a cooking container including a housing unit having an entrance through which hot air enters, and a support unit on the housing unit and on which one or more cooking objects are placed,
wherein the introduction hole section is in a lower part of the rear wall plate, and the first discharge hole section is in an upper part of the rear wall plate separate from the introduction hole section,
wherein the circulation duct unit comprises:
a circulation duct having one end connected to the second discharge hole section and another end connected to a suction hole section in the side wall plate, configured to guide air discharged through the first discharge hole section to the suction hole section; and
a duct opening and closing section in the circulation duct, configured to open and close an internal flow path of the circulation duct,
wherein the circulation duct includes a discharge opening for discharging air entering through the discharge hole section out of the circulation duct,
wherein the duct opening and closing section closes the discharge opening when opening the internal flow path of the circulation duct, and opens the discharge opening when closing the internal flow path of the circulation duct.

8. The convection cooking apparatus according to claim 7, wherein the cooking container is in the cooking chamber.

9. The convection cooking apparatus according to claim 7, wherein the cooking container further includes a cover unit that covers the support unit.

10. The convection cooking apparatus according to claim 9, wherein the cover unit is configured to block movement of hot air.

* * * * *